US012694800B2

(12) United States Patent
van Nierop et al.

(10) Patent No.: US 12,694,800 B2
(45) Date of Patent: Jul. 28, 2026

(54) ELECTRONIC TRAINING SYSTEM AND METHOD FOR SURGICAL PROCEDURES

(71) Applicant: Maquet Cardiovascular LLC, Wayne, NJ (US)

(72) Inventors: Wouter Pieter van Nierop, Leiden (NL); Thorsten Prien, Heikendorf (DE); Cindy Blasewitz, Wallingford, CT (US); Markus Adrianus Petrus van Kuijk, Valkenswaard (NL); Jurriaan Hubrecht van Rijswijk, Helmond (NL); Christian Knaapen, Delft (NL); Bas Dado, Delft (NL); Pepijn Rijnbout, Goirle (NL); Menno Deen, Ultrecht (NL); Stephen Zlock, Redding, CT (US); Tracie Pickering, Dallas, TX (US); Ashik A. Mohan, Alamo, CA (US)

(73) Assignee: Maquet Cardiovascular LLC, Wayne, NJ (US)

( * ) Notice: Subject to any disclaimer, the term of this patent is extended or adjusted under 35 U.S.C. 154(b) by 0 days.

(21) Appl. No.: 18/612,102

(22) Filed: Mar. 21, 2024

(65) Prior Publication Data

US 2024/0321141 A1     Sep. 26, 2024

Related U.S. Application Data

(60) Provisional application No. 63/491,403, filed on Mar. 21, 2023.

(51) Int. Cl.
G09B 23/28     (2006.01)
G09B 5/02     (2006.01)

(52) U.S. Cl.
CPC ............. G09B 23/285 (2013.01); G09B 5/02 (2013.01)

(58) Field of Classification Search
CPC ........ G09B 23/28; G09B 23/285; G09B 5/02; G09B 23/30; G09B 23/32
See application file for complete search history.

(56) References Cited

U.S. PATENT DOCUMENTS 6,997,719 B2     2/2006  Wellman et al.
9,498,246 B2    11/2016  Chin et al.
(Continued)

OTHER PUBLICATIONS

Maquet Medical Systems USA, Innovation for Optimized Outcomes Vasoview Endoscopic Vessel Harvesting Systems, Feb. 2014, 16 pages, printed in USA.
(Continued)

*Primary Examiner* — Timothy A Musselman
(74) *Attorney, Agent, or Firm* — Fay Kaplun & Marcin, LLP

(57)     ABSTRACT

A training system that allows a user to practice performing movements commonly performed during an endoscopic vessel harvesting surgical procedure includes a manipulation device representative of components of a vessel harvesting device. The manipulation device includes a first tool having a main handle configured to be grasped by a user and a second tool having an auxiliary handle including a shaft inserted through an opening in the main handle. The training system also includes a video display and a controller in electronic communication with sensors of the manipulation device and the video display. The controller is configured to: receive and process signals from the sensors of the manipulation device to determine movement information for the manipulation device and cause at least one visual indication to be provided on the video display at a position on the video display based, at least in part, on the determined movement information.

24 Claims, 22 Drawing Sheets

(56)     References Cited

U.S. PATENT DOCUMENTS

| | | | |
|---|---|---|---|
| 9,814,481 | B2 | 11/2017 | Orphanos et al. |
| 9,943,328 | B2 | 4/2018 | Orphanos et al. |
| 2004/0076940 | A1* | 4/2004 | Alexander ........... G09B 23/285 |
| | | | 434/262 |
| 2010/0179428 | A1* | 7/2010 | Pedersen .............. A61B 8/4254 |
| | | | 600/443 |
| 2012/0016336 | A1* | 1/2012 | Whitehurst ........ A61N 1/36096 |
| | | | 607/46 |
| 2013/0316318 | A1* | 11/2013 | Frank ..................... A61B 34/25 |
| | | | 434/262 |
| 2022/0265373 | A1* | 8/2022 | Kim ...................... G06F 3/0482 |

OTHER PUBLICATIONS

Pawar et al., "Gamification in medical education: A new approach", Oral Oncology Reports, vol. 9, Mar. 2024, 100209, 2 sheets.
Jalink, "Validation of a video game made for training laparoscopic skills", Thesis fully internal (DIV), University of Groningen, Dec. 17, 2014, 152 sheets.
Wang et al., "Gamification in medical education: identifying and prioritizing key elements through Delphi method", Medical Education Online, Jan. 9, 2024, 14 sheets.
Gentry et al., "Serious Gaming and Gamification Education in Health Professions: Systematic Review", Journal of Medical Internet Research, vol. 21, No. 3, Mar. 28, 2019, 20 sheets.

* cited by examiner

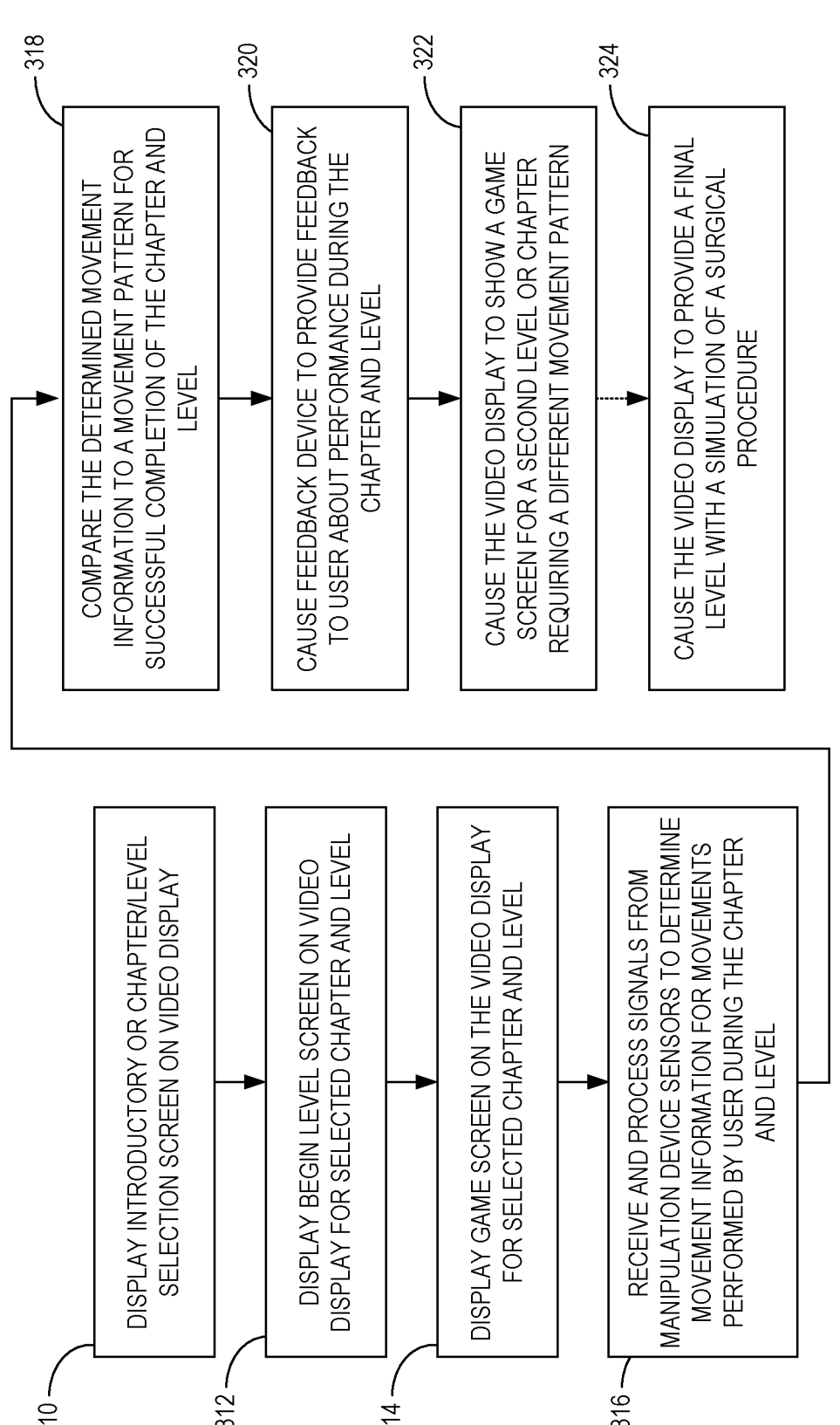

310 — DISPLAY INTRODUCTORY OR CHAPTER/LEVEL SELECTION SCREEN ON VIDEO DISPLAY

312 — DISPLAY BEGIN LEVEL SCREEN ON VIDEO DISPLAY FOR SELECTED CHAPTER AND LEVEL

314 — DISPLAY GAME SCREEN ON THE VIDEO DISPLAY FOR SELECTED CHAPTER AND LEVEL

316 — RECEIVE AND PROCESS SIGNALS FROM MANIPULATION DEVICE SENSORS TO DETERMINE MOVEMENT INFORMATION FOR MOVEMENTS PERFORMED BY USER DURING THE CHAPTER AND LEVEL

318 — COMPARE THE DETERMINED MOVEMENT INFORMATION TO A MOVEMENT PATTERN FOR SUCCESSFUL COMPLETION OF THE CHAPTER AND LEVEL

320 — CAUSE FEEDBACK DEVICE TO PROVIDE FEEDBACK TO USER ABOUT PERFORMANCE DURING THE CHAPTER AND LEVEL

322 — CAUSE THE VIDEO DISPLAY TO SHOW A GAME SCREEN FOR A SECOND LEVEL OR CHAPTER REQUIRING A DIFFERENT MOVEMENT PATTERN

324 — CAUSE THE VIDEO DISPLAY TO PROVIDE A FINAL LEVEL WITH A SIMULATION OF A SURGICAL PROCEDURE

FIG. 11

ELECTRONIC TRAINING SYSTEM AND METHOD FOR SURGICAL PROCEDURES

CROSS REFERENCE TO RELATED APPLICATION

The present application claims the benefit of U.S. Provisional Patent Application No. 63/491,403, filed Mar. 21, 2023, the disclosure of which is hereby incorporated by reference in its entirety.

BACKGROUND OF THE DISCLOSURE

Field of the Disclosure

The present disclosure relates to training and simulation tools that allow medical personnel to gain experience in execution of aspects of a medical procedure and, in particular, to training systems and computer methods that allow a user to practice performing movements commonly performed during a surgical procedure, such as during performance of an endoscopic vessel harvesting surgical procedure, in a video game environment.

Description of Related Art

Endoscopic vessel harvesting (EVH) is a surgical technique in which a trained medical professional removes or harvests a healthy blood vessel from one part of the body, routinely from an arm or a leg, and often in conjunction with coronary bypass surgery. To create a bypass graft, trained medical personnel may remove or "harvest" healthy blood vessels from another part of the body, often from a patient's leg or arm. This vessel becomes a graft, with one end attaching to a blood source above and the other end below the blocked area, creating a conduit or channel that provides a new blood flow connection. EVH is a minimally invasive surgical procedure performed using an endoscope and a vessel harvesting device in order to visualize, cut, and seal side branches and to remove the healthy blood vessels with minimal trauma to the vessel or surrounding tissues.

A variety of minimally invasive instruments are available by different manufacturers for use in EVH procedures. For example, the Vasoview Hemopro and Vasoview Hemopro 2 EVH systems by Maquet Cardiovascular (Getinge AB) are minimally invasive instruments including an endoscope and tools for dissecting tissue and simultaneously cutting and sealing blood vessels and other tissues during an EVH procedure. The Vasoview Hemopro and Hemopro 2 include a main handle connected to a hollow tube, a channel for an endoscope, and an auxiliary handle connected to a shaft. The shaft of the auxiliary handle is inserted into the main handle through a channel of the hollow tube. The main handle controls extension, retraction, and positioning of a vessel cradle or c-ring, which is incorporated into the main handle and hollow tube.

The auxiliary handle controls movement of a harvest tool, such as a gripper, harvest jaws, or a cutter tool. The Vasoview Hemopro or Hemopro 2 main handle includes a main housing portion and an independent rotatable housing portion with an endoscope port. The main handle can also include a light hub slot and a camera port, which is an area for attaching the endoscope to a camera head. The VirtuoSaph® Plus EVH system by Terumo Medical is another example of an EVH device including a main handle that controls a harvester tool for coagulating and cutting branches of, for example, a saphenous vein or radial artery.

The VirtuoSaph® device also includes an auxiliary portion configured to control a dissector tool that dissects, for example, the saphenous vein, radial artery, and surrounding branches.

The Saphena Venapax by Saphena Medical is another EVH device for performing an EVH procedure. The Venapax device is a single-tool device including a main handle and an elongated tube extending from a distal end of the main handle. A cutting or harvest tool, such as a pair of electrode blades for cutting and cauterizing tissue, extends from a distal end of the elongated tube.

Because EVH surgical procedures are often performed by less experienced persons for several months or years during surgical training, hospitals often do not have a significant number of professionals with training and long-term experience using EVH devices. Accordingly, it is important that training is consistently available for using EVH devices for trainees, residents, and students, so that each new class of students, residents, and interns can be quickly and properly trained in use of EVH devices. In many cases, training in use of EVH devices is provided using inanimate leg models, and often cadavers, which can be difficult and expensive to procure. During training, a training proctor may be employed to train a novice on the features and usability of a particular EVH device. Training about features of the device and/or training using the leg model can be provided in an empty operating room, surgical theater, or sub-room where a standard endoscopic tower is available. Training using cadavers can be provided in a laboratory. Proctored training can also include live operating room training on patients. Requirements for proctored training can include, for example, sterilized medical instruments, such as a light cable, camera head, endoscope, power supply, and functioning EVH device. Disadvantages of such proctored training can include scheduling conflicts due to limited operating room availability, as well as inconvenience of needing to acquire sterilized equipment (camera head, light cable, etc.) for each training session. Another disadvantage of training using a leg model is that such models can be large and cumbersome. Also, manual maintenance is needed to maintain the leg model in working order. Further, a leg model is static in size, shape, and appearance, meaning that the trainee does not gain experience with different types of patients, anatomy, or surgical scenarios. Further, while a trainee can use a leg model independently to gain additional practice, he or she receives only minimal feedback or correction when a proctor is not available to observe the trainee performing training exercises and procedures. Proctored training using a cadaver, if available, is also very expensive due to cost of the proctor, costs for obtaining a suitable cadaver for training purposes, and costs for securing a laboratory in order to work on the cadaver.

For these reasons, there is a need for training systems and methods that allow users (e.g., surgical interns, trainees, residents, and any other medical personnel) to gain experience using medical tools for surgical procedures, such as EVH devices. Such systems and methods should allow trainees to practice using the medical tools on a frequent basis and should provide feedback so that the trainee can identify techniques that require additional practice and improvement. The systems and methods of the present disclosure are provided in order to facilitate training for these medical personnel so that medical facilities can have a larger number of individuals with suitable training and experience to perform EVH procedures.

SUMMARY OF THE DISCLOSURE

According to an aspect of the present disclosure, a training system that allows a user to practice performing movements commonly performed during an endoscopic vessel harvesting surgical procedure includes a manipulation device representative of components of a vessel harvesting device. The manipulation device includes a first tool having a main handle configured to be grasped by a user, a hollow tube extending from the main handle, and at least one first button on the main handle and a second tool having an auxiliary handle configured to be grasped by the user, a shaft inserted through an opening in the main handle and movable through the hollow tube of the first tool, and at least one second button on the auxiliary handle. The manipulation device also includes sensors configured to detect movement of the manipulation device, movement of the second tool relative to the first tool, or actuation or pressing of the at least one first button or the at least one second button. The training system also includes a video display and a controller in electronic communication with the sensors of the manipulation device and the video display. The controller is configured to: receive and process signals from the sensors of the manipulation device to determine movement information for the manipulation device; and cause at least one visual indication to be provided on the video display at a position on the video display based, at least in part, on the determined movement information.

According to another aspect of the present disclosure, a computer implemented method for training a user that allows the user to practice performing movements commonly performed during an endoscope vessel harvesting surgical procedure includes, with at least one computer processor, receiving and processing signals from a plurality of sensors of a manipulation device to determine movement information for the manipulation device. The manipulation device is representative of components of a vessel harvesting device. The manipulation device includes: a first tool having a main handle configured to be grasped by the user, a hollow tube extending from the main handle, and at least one first button on the main handle; and a second tool having an auxiliary handle configured to be grasped by the user, a shaft inserted through an opening in the main handle and movable through the hollow tube of the first tool, and at least one second button on the auxiliary handle. The plurality of sensors are configured to detect the movement information, which is representative of movement of the manipulation device, movement of the second tool relative to the first tool, or actuation or pressing of the at least one first button or the at least one second button. The method further includes, with the at least one computer processor, causing at least one visual indication to be provided on a video display at a position on the video display determined based, at least in part, on the determined movement information.

According to another aspect of the present disclosure, a computer implemented training method for training in execution of a surgical procedure includes causing a video display operatively connected to a dexterity training device representative of components of a vessel harvesting device to provide a first level of an interactive video animation displayed by the video display requiring a first movement pattern for successful completion of the first level. The dexterity training device includes at least one sensor configured to detect movement of the dexterity training device. The method further includes receiving and processing signals from the at least one sensor of the dexterity training device to determine movement information for the dexterity training device. The method further includes comparing the movement information for the dexterity training device to the first movement pattern for the first level to determine when the first level is successfully completed. The method further includes, upon successful completion of the first level, causing the video display to provide on the video display device a second level of the interactive video animation requiring a second movement pattern for successful completion. The second movement pattern for successful completion of the second level more closely corresponds to movements performed during execution of the surgical procedure than are movements of the first movement pattern required for successful completion of the first level.

According to another aspect of the present disclosure, a training system for execution of a surgical procedure includes a dexterity training device representative of components of a vessel harvesting device and a video display device. The dexterity training device is operatively connected to the video display device so that manipulation of the dexterity training device by a user is reflected as movement of one or more components of the vessel harvesting device in an interactive video animation displayed by the video display device.

Non-limiting illustrative examples of embodiments of the present disclosure will now be described in the following numbered clauses:

Clause 1: A training system that allows a user to practice performing movements commonly performed during an endoscopic vessel harvesting surgical procedure, the system comprising: a manipulation device representative of components of a vessel harvesting device, the manipulation device comprising: a first tool comprising a main handle configured to be grasped by the user, a hollow tube extending from the main handle, and at least one first button on the main handle; a second tool comprising an auxiliary handle configured to be grasped by the user, a shaft inserted through an opening in the main handle and movable through the hollow tube of the first tool, and at least one second button on the auxiliary handle; and sensors configured to detect movement of the manipulation device, movement of the second tool relative to the first tool, or actuation or pressing of the at least one first button or the at least one second button; a video display; and a controller in electronic communication with the sensors of the manipulation device and the video display, the controller configured to: receive and process signals from the sensors of the manipulation device to determine movement information for the manipulation device; and cause at least one visual indication to be provided on the video display at a position on the video display based, at least in part, on the determined movement information.

Clause 2: The system of clause 1, wherein the manipulation device is a size and shape of the vessel harvesting device used in the endoscopic vessel harvesting surgical procedure.

Clause 3: The system of clause 1 or clause 2, wherein the at least one visual indication provided on the video display is not an anatomical structure shown in connection with a virtual simulated surgical procedure.

Clause 4: The system of any of clauses 1-3, wherein the sensors comprise at least one button sensor that detects movement of the at least one first button or the at least one second button, and wherein the controller is further configured to receive and process signals from the at least one button sensor to detect the actuation or pressing of the at least one first button or the at least one second button, and to modify the position of the at least one visual indication on the video display based on the detected pressing or actuation.

Clause 5: The system of clause 4, wherein the at least one first button comprises a slider, and the at least one button sensor comprises at least one of a switch, an encoder, a linear potentiometer, or a voltage divider.

Clause 6: The system of clause 5, wherein the at least one slider represents a slider that extends or retracts a vessel cradle, such as a c-ring, that extends from a distal end of the vessel harvesting device, and/or wherein the at least one second button of the second tool represents a button that controls jaws of a harvesting tool or the vessel harvesting device configured to cut or seal vein branches.

Clause 7: The system of any of clauses 1-6, wherein the at least one second button comprises an activation toggle, and the at least one button sensor comprises at least one of a switch, an encoder, a linear potentiometer, or a voltage divider.

Clause 8: The system of any of clauses 1-7, wherein the sensors of the manipulation device are configured to detect at least the following movements of the manipulation device: rotation of the entire manipulation device about a longitudinal axis of the manipulation device; pivoting of the entire manipulation device about a pivot point; or linear movement of the manipulation device in at least one direction.

Clause 9: The system of clause 8, wherein the sensors comprise at least one of an encoder, time-of-flight sensor, accelerometer, or gyroscope configured to sense signals representative of linear or rotational movement of the entire manipulation device.

Clause 10: The system of any of clauses 1-9, wherein the sensors comprise a potentiometer or a voltage divider mounted to a stationary frame configured to sense movement of the entire manipulation device relative to the stationary frame.

Clause 11: The system of any of clauses 1-10, wherein the sensors of the manipulation device are configured to detect at least the following movements of the second tool relative to the first tool: rotation of the auxiliary handle of the second tool about a longitudinal axis of the second tool; or linear movement of the shaft of the second tool through the main handle and through the hollow tube of the first tool.

Clause 12: The system of clause 11, wherein the sensors comprise a linear encoder, time-of-flight sensor, or linear potentiometer for measurement of linear movement of the second tool relative to the first tool, and a rotational encoder or rotational potentiometer for sensing rotational movement of the second tool relative to the first tool, and wherein the movement information determined by the controller is based, at least in part, on differences in signals detected by the linear encoder, time-of-flight sensor, or linear potentiometer and the rotational encoder or rotational potentiometer.

Clause 13: The system of any of clauses 1-12, wherein the manipulation device further comprises at least one resistor coupled between the first tool and the second tool configured to provide resistance to movement of the second tool relative to the first tool.

Clause 14: The system of clause 13, wherein the manipulation device is configured to adjust a resistance of the at least one resistor to mimic forces exerted on a medical device during a surgical procedure.

Clause 15: The system of clause 13 or clause 14, wherein the at least one resistor comprises a gear mounted within a track and configured to travel along the track as the second tool is inserted into or retracted from the first tool.

Clause 16: The system of any of clauses 1-15, further comprising a rotatable handle extending from the main handle of the first tool, the rotatable handle comprising a camera head and at least one camera position sensor configured to determine movement of the rotatable handle and the camera head relative to the main handle.

Clause 17: The system of clause 16, wherein the at least one camera position sensor of the rotatable handle is in communication with the controller and wherein the controller is configured to: receive and process signals from the at least one camera position sensor of the rotatable handle to determine an orientation of the camera head relative to the main handle; and modify an orientation of a background image provided on the video display based on the determined orientation.

Clause 18: The system of clause 17, wherein the background image and the at least one visual indication are provided on the video display simultaneously.

Clause 19: The system of clause 17 or clause 18, wherein when the controller is further configured to: determine a direction and magnitude of rotation of the camera head relative to the main handle based on the received and processed signals from the at least one camera position sensor or other sensors; and cause the background image on the video display to rotate to correspond to the determined magnitude and direction.

Clause 20: The system of any of clauses 1-19, wherein the controller is further configured to provide a guide icon on the video display which is initially provided at a predetermined position on the video display, and wherein the controller is configured to move the guide icon to other positions on the video display based on the movement information detected by the sensors of the manipulation device.

Clause 21: The system of clause 20, wherein movement of the manipulation device in at least one direction causes portions of the at least one visual indication to disappear from the video display so that the guide icon can be more easily seen or wherein movement of the manipulation device in other directions causes the at least one visual indication to obscure the guide icon shown on the video display.

Clause 22: The system of any of clauses 1-21, wherein the controller is configured to compare the determined movement information to predetermined preferred movement patterns and to provide feedback on the video display based on the comparison.

Clause 23: The system of clause 22, wherein the feedback comprises at least one of a total time to perform at least one of the predetermined preferred movement patterns or a number of movements of the manipulation device required to complete the at least one of the predetermined preferred movement patterns.

Clause 24: The system of any of clauses 1-23, wherein the video display comprises a virtual reality or augmented reality display.

Clause 25: A computer implemented method for training a user that allows the user to practice performing movements commonly performed during an endoscopic vessel harvesting surgical procedure, the method comprising: with at least one computer processor, receiving and processing signals from a plurality of sensors of a manipulation device to determine movement information for the manipulation device, wherein the manipulation device is representative of components of a vessel harvesting device, the manipulation device comprising: a first tool comprising a main handle configured to be grasped by the user, a hollow tube extending from the main handle, and at least one first button on the main handle; and a second tool comprising an auxiliary handle configured to be grasped by the user, a shaft inserted through an opening in the main handle and movable through the hollow tube of the first tool, and at least one second button on the auxiliary handle; wherein the plurality of sensors are configured to detect the movement information, which is representative of movement of the manipulation device, movement of the second tool relative to the first tool, or actuation or pressing of the at least one first button or the at least one second button; and with the at least one computer processor, causing at least one visual indication to be provided on a video display at a position on the video display determined based, at least in part, on the determined movement information.

Clause 26: The method of clause 25, wherein the manipulation device is a size and shape of the vessel harvesting device used in the endoscopic vessel harvesting surgical procedure.

Clause 27: The method of clause 25 or clause 26, wherein the plurality of sensors comprise at least one button sensor that detects movement of the at least one first button or the at least one second button, and wherein the controller is further configured to receive and process signals from the at least one button sensor to detect the movement of the at least one first button or the at least one second button and to modify the position of the at least one visual indication on the video display based on the detected movement.

Clause 28: The method of any of clauses 25-27, wherein the at least one first button of the first tool represents a slider that extends or retracts a vessel cradle, such as a c-ring, that extends from a distal end of the vessel harvesting device, or wherein the at least one second button of the second tool represents an actuation toggle that controls jaws of a harvest tool of the vessel harvesting device configured to at least one of capture, cut, or seal vein branches.

Clause 29: The method of any of clauses 25-28, wherein the plurality of sensors of the manipulation device are configured to detect at least the following movements of the manipulation device: rotation of the entire manipulation device about a longitudinal axis of the manipulation device; pivoting of the entire manipulation device about a pivot point; or linear movement of the manipulation device in at least one direction.

Clause 30: A computer implemented training method for training in execution of a surgical procedure, the method comprising: causing a video display operatively connected to a dexterity training device representative of components of a vessel harvesting device to provide a first level of an interactive video animation displayed by the video display requiring a first movement pattern for successful completion of the first level, wherein the dexterity training device comprises at least one sensor configured to detect movement of the dexterity training device; receiving and processing signals from the at least one sensor of the dexterity training device to determine movement information for the dexterity training device; comparing the determined movement information for the dexterity training device to the first movement pattern for the first level to determine when the first level is successfully completed; and upon successful completion of the first level, causing the video display to provide on a video display device a second level of the interactive video animation requiring a second movement pattern for successful completion, wherein the second movement pattern for successful completion of the second level more closely corresponds to movements performed during execution of the surgical procedure than are movements of the first movement pattern required for successful completion of the first level.

Clause 31: The method of clause 30, wherein the first movement pattern requires movement of the dexterity training device in a forward direction and a backward direction, and the second movement pattern requires movement of the dexterity training device in forward, backward, and side-to-side directions.

Clause 32: The method of clause 30 or clause 31, wherein the first movement pattern requires movement of the dexterity training device in a first plane, and the second movement pattern requires movement of the dexterity training device in the first plane and at least one additional plane.

Clause 33: The method of any of clauses 30-32, wherein the first movement pattern requires moving along a straight path and the second movement pattern requires moving on a pivot point.

Clause 34: The method of any of clauses 30-33, wherein the second movement pattern comprises pivoting the dexterity training device about a pivot point.

Clause 35: The method of any of clauses 30-34, wherein the first movement pattern is representative of movements performed outside a vessel during a vessel harvesting procedure.

Clause 36: The method of any of clauses 30-35, wherein the second movement pattern comprises manipulating a slider of the dexterity training tool that represents a slider that extends or retracts a vessel cradle, such as a c-ring, that extends from a distal end of the vessel harvesting device, and wherein a third movement pattern comprises manipulating a second button of the dexterity training tool that represents an actuation toggle that controls jaws of a harvest tool of the vessel harvesting device configured to at least one of cut or seal vein branches.

Clause 37: The method of any of clauses 30-36, wherein the second level of the interactive video animation includes images of smoke or streams of liquid shown on the video display which obstruct a user's view of other virtual objects shown in the video display.

Clause 38: The method of any of clauses 30-37, wherein the dexterity training device comprises: a resistor for resisting forward or backward movement of the dexterity training device, and wherein the method further comprises adjusting a resistance of the resistor in response to movements of the dexterity training device by the user and/or based on a location within the interactive video animation.

Clause 39: The method of any of clauses 30-38, further comprising, following successful completion of the second level and one or more subsequent levels, causing the video display device to provide on the video display a final level of the interactive video animation requiring a final movement pattern for successful completion, wherein the interactive video animation of the final level comprises images representative of a real-life vessel harvesting surgical procedure, and wherein movements of the final movement pattern are movements performed with the vessel harvesting device during the real-life vessel harvesting surgical procedure.

Clause 40: The method of clause 39, wherein the final level comprises a virtual simulation of the surgical procedure.

Clause 41: A training system for execution of a surgical procedure, the system comprising: a dexterity training device representative of components of a vessel harvesting device; and a video display device, wherein the dexterity training device is operatively connected to the video display device so that manipulation of the dexterity training device by a user is reflected as movement of one or more components of the vessel harvesting device in an interactive video animation displayed by the video display device.

Clause 42: The training system of clause 41, wherein the surgical procedure is an endoscopic vessel harvesting surgical procedure.

Clause 43: The training system of clause 41 or clause 42, wherein the video display device displays the interactive video animation comprising a fantasy video game and not a simulated surgical procedure.

Clause 44: The training system of any of clauses 41-43, wherein the dexterity training device comprises: a first tool comprising a main handle configured to be grasped by the user, a hollow tube extending from the main handle, and at least one slider on the main handle; a second tool comprising an auxiliary handle configured to be grasped by the user, a shaft inserted through an opening in the main handle and movable through the hollow tube of the first tool, and at least one second button on the auxiliary handle; and a plurality of sensors configured to detect one or more of movement of the dexterity training device, movement of the second tool relative to the first tool, sliding of the at least one slider and movement of the at least one second button.

Clause 45: The training system of clause 44, wherein the plurality of sensors of the dexterity training device are configured to detect at least the following movements of the dexterity training device: rotation of the entire dexterity training device about a longitudinal axis of the dexterity training device; pivoting of the entire dexterity training device about a pivot point; or linear movement of the dexterity training device in at least one direction.

Clause 46: The training system of clause 44 or clause 45, wherein the plurality of sensors comprise at least one of an encoder, time-of-flight sensor, accelerometer or gyroscope configured to sense signals representative of linear or rotational movement of the entire dexterity training device.

Clause 47: The training system of any of clauses 44-46, further comprising: a controller in electronic communication with the plurality of sensors of the dexterity training device and the video display device, wherein the controller is configured to: receive and process signals from the plurality of sensors of the dexterity training device to determine movement information for the dexterity training device; and based, at least in part, on the determined movement information, cause at least one visual indication within the fantasy video game to be provided on the video display reflecting corresponding movement of some component of the dexterity training device within the fantasy video game.

Clause 48: The training system of clause 47, wherein the controller is further configured to provide a guide icon on the video display device, which is initially provided at a predetermined position on the video display device, and wherein the controller is configured to move the guide icon to other positions on the video display device based on the movement information detected by the plurality of sensors of the dexterity training device.

Clause 49: The training system of clause 47 or clause 48, wherein the controller is further configured to compare the determined movement information to predetermined preferred movement patterns and to provide feedback on the video display device based on the comparison.

Clause 50: The training system of clause 49, wherein the feedback comprises at least one of a total time to perform at least one of the predetermined preferred movement patterns or a number of movements of the dexterity training device required to complete the at least one of the predetermined preferred movement patterns.

Clause 51: The training system of any of clauses 44-50, wherein the dexterity training device further comprises at least one resistor coupled between the first tool and the second tool configured to provide resistance to movement of the second tool relative to the first tool.

Clause 52: The training system of clause 51, wherein the at least one resistor comprises a gear mounted within a track and configured to travel along the track as the second tool is inserted into or retracted from the first tool.

Clause 53: The training system of any of clauses 44-52, wherein the dexterity training device further comprises a rotatable handle extending from the main handle of the first tool comprising a camera head and at least one camera position sensor of the plurality of sensors, which is configured to determine movement of the rotatable handle relative to the main handle.

These and other features and characteristics of the invention, as well as the methods of operation and functions of the related elements of structures and the combination of parts and economics of manufacture, will become more apparent upon consideration of the following description and appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 11 is a flow chart of a method for training an individual in execution of a medical or surgical procedure, according to an aspect of the present disclosure.

DETAILED DESCRIPTION

Figure 1A:
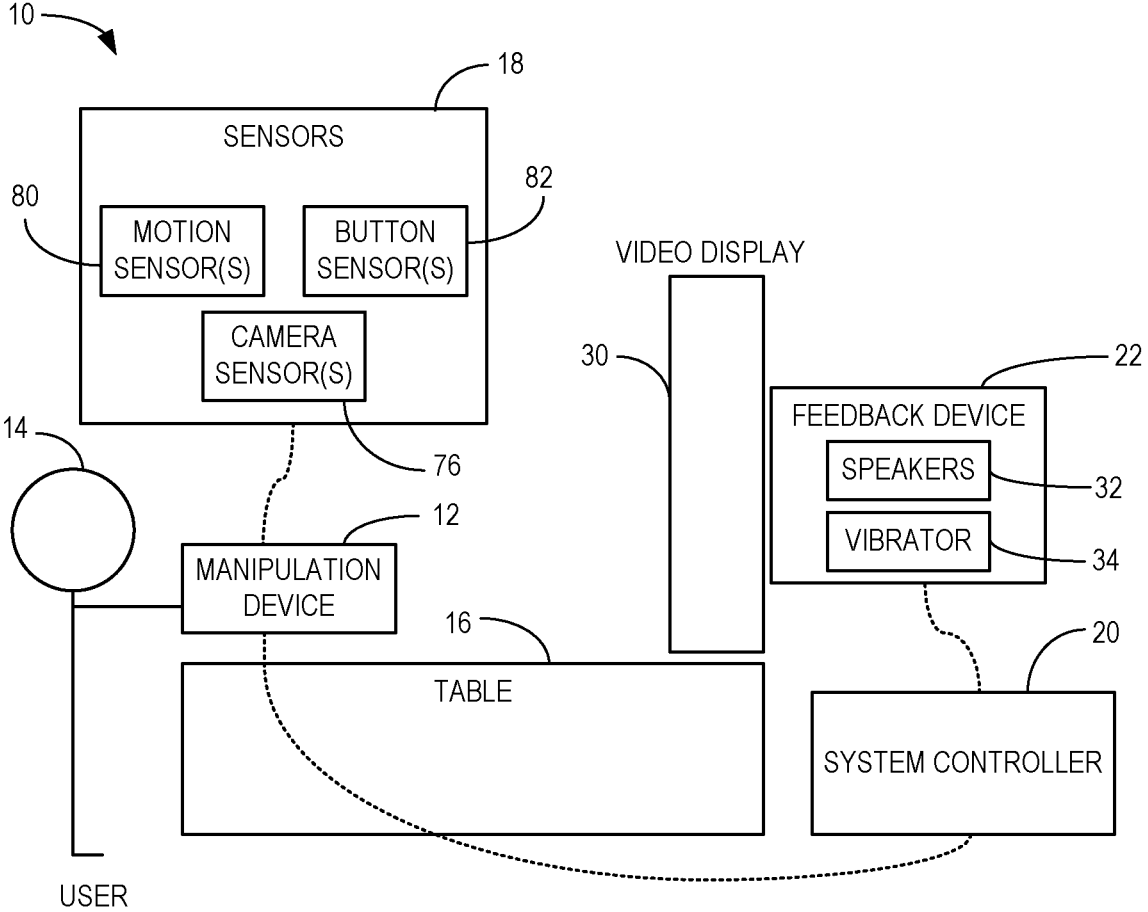
FIG. 1A is a schematic drawing of a training system for execution of a medical or surgical procedure, according to an aspect of the present disclosure.

The illustrations generally show illustrative and non-limiting aspects of the devices, assemblies, and methods of the present disclosure. While the descriptions present various aspects of the devices and assemblies, it should not be interpreted in any way as limiting the disclosure. Furthermore, modifications, concepts, and applications of the disclosure's aspects are to be interpreted by those skilled in the art as being encompassed by, but not limited to, the illustrations and descriptions herein.

Further, for purposes of the description hereinafter, the terms "end", "upper", "lower", "right", "left", "vertical", "horizontal", "top", "bottom", "lateral", "longitudinal", "radial", and derivatives thereof shall relate to the disclosure as it is oriented in the drawing figures. The term "proximal" refers to the direction toward the center or central region of the device or its point of contact with the user. The term "distal" refers to the outward direction extending away from the central region of the device or its point of contact with the user. However, it is to be understood that the disclosure may assume various alternative variations and step sequences, except where expressly specified to the contrary. It is also to be understood that the specific devices and processes illustrated in the attached drawings, and described in the following specification, are simply exemplary aspects of the disclosure. Hence, specific dimensions and other physical characteristics related to the aspects disclosed herein are not to be considered as limiting. For the purpose of facilitating understanding of the disclosure, the accompanying drawings and description illustrate preferred aspects thereof, from which the disclosure, various aspects of its structures, construction and method of operation, and many advantages may be understood and appreciated.

The training system 10 of the present disclosure allows a user, also referred to herein as a video game player, to practice performing actions of a medical procedure. In some non-limiting examples, the user practices performing aspects of the medical procedure in a non-medical virtual environment, such as by completing levels or chapters of a video game. For example, in the video game of the present disclosure, the user can interact with characters and objects, such as computer-generated and/or cartoon representations of animals (e.g., bunnies, butterflies, dogs, cats, foxes, etc.), plants (e.g., trees, bushes, flowers), mythological creatures (e.g., sea monsters, hydra, goblins, fairies), or other objects selected for a particular video game theme, while practicing skills used during medical procedures. The "user" of the training system 10 can be any medically trained or untrained individual desiring to gain experience using a medical tool and performing a medical procedure. For example, for an endoscopic vessel harvesting procedure, the "user" of the training system 10 can be a medical resident, trainee, surgical intern, or physician assistant responsible for performing the vessel harvesting procedure using the vessel harvesting device. In other examples, the "user" of the training system can be a surgeon, physician, or any other trained or un-trained medical personnel. The non-medical virtual environment in initial or early levels of the game may not require previous medical knowledge or skill to successfully complete the levels. Subsequent or final levels of the game can mimic specific scenarios that occur during a medical procedure and can require specific advanced skills and/or knowledge of a sequence of movements that should be performed during the medical procedure to successfully complete the final levels.

In some examples, the training system 10 of the present disclosure allows the user or video game player to practice using a representation of a real-world medical device, referred to herein as a manipulation device or a dexterity training device, that resembles a medical tool used to perform the actual medical procedure to gain experience and confidence in use of the device. For example, the manipulation device or dexterity training device can include parts that resemble parts of the real-world medical tool in shape, size, and function, so that the user or player gains experience in manipulating and using a device that appears to be as real as possible. It is believed that practicing in the context of a video game including non-medical (e.g., fantasy, make-believe, or mythological) themes can be more enjoyable for users than surgical simulations, making users more likely to practice during free time (e.g., non-working hours).

In some non-limiting examples, the medical procedure practiced using the training system 10 of the present disclosure is a vessel harvesting procedure and the medical tool is a vessel harvesting device, such as the Maquet Cardiovascular (Getinge AB) Vasoview Hemopro or Hemopro 2 EVH device. In other examples, the manipulation device or the dexterity training device can be made to resemble vessel harvesting devices by other manufacturers, such as vessel harvesting devices by Saphena Medical or Terumo Medical Corporation.

In some examples, the training system 10 can include electrical components and devices, such as a computer processor and video display, for displaying interactive video animations of the video game to the user. The video game can include multiple levels or chapters that test different skills and movement techniques used during the medical procedure. The levels or chapters can be of increasing complexity and/or can more closely mimic aspects of the medical procedure as the user progresses through the video game. For example, an initial level or chapter of the video game may allow a user to practice a simple movement technique, such as movement of the manipulation device in one direction (e.g., movement along a longitudinal axis of the device). Subsequent levels or chapters may teach more complex movements or movements that require manipulating different parts of the manipulation device simultaneously or according to a specific sequence. When used for a vessel harvesting procedure, the video game can provide a stepby-step progression from the basic skills for controlling the vessel harvesting device (e.g., movement of the device to adjust a line-of-sight for a camera or endoscope) to more complex movements for different functional parts of the vessel harvesting device (e.g., manipulation of a guide tool, such as a vessel cradle, and a harvest tool) simultaneously or in sequence.

In some examples, the training system 10 and video game can be configured to provide feedback to help users evaluate how well they performed and to identify areas or techniques requiring further practice, instruction, or training. For example, a computer controller of the training system 10 can be configured to monitor movements of the manipulation device to determine whether the user succeeds or fails to complete a particular chapter or level of the game. As in many video games, the user may be required to restart a level or chapter from the beginning each time that he or she fails to successfully complete the level. In some examples, the training system 10 can provide a score or other quantitative feedback either in real time (e.g., during the level) or following completion of the level so that users can compare their performance with performance of friends, colleagues, or to an average score for a group of individuals of similar training and experience. The feedback can include, for example, information about a time to complete certain tasks (e.g., movement speed), a total number of individual movements to complete a task (e.g., movement efficiency), or a score related to a number of correct vs. incorrect movements (e.g., movement accuracy).

In some examples, information and data recorded by the training system 10 and video game software for multiple users and/or multiple training sessions can be collected and analyzed to draw conclusions about device design and/or for design validation (e.g., to perform design validation usability studies). For example, data recorded during use of the training system 10 and video game can be analyzed to provide feedback for designers about parts of a medical device or surgical tool that are difficult to use and/or that are most likely to produce incorrect movements. Data recorded by the training system 10 may also be analyzed to evaluate movement actions or game stages that take the longest for users to complete correctly and/or game stage where the most errors occur. Designers may use this information to modify future designs to address difficulties encountered by the users. Also, based on analysis of recorded data, the training system 10 and video game can be configured to notify designers about possible redesigns or modifications that improve ergonomics of the medical devices and tools. Data recorded by the training system 10 can also be analyzed by designers to evaluate possible design modifications for existing products and to provide guidance for new device design or for accepting/rejecting devices currently in development.

Training System

With reference to FIG. 1A, the training system 10 for practicing using a medical device to perform a medical procedure includes a game controller, such as a manipulation device 12 or dexterity training device, which is manipulated by a user 14 or video game player to perform movements and actions of the medical procedure. As previously described, in order to complete levels or chapters of the video game, the user 14 must perform certain movements and successfully complete tasks associated with different levels or chapters of the video game. In some examples, the components of the training system 10, such as a housing for the manipulation device and/or display screen, can be positioned on a flat surface of a table 16 at about waist height for the user 14 so that the user 14 can easily grasp and use the manipulation device 12. The manipulation device 12 can be representative of a medical tool, such as the endoscopic vessel harvesting device used for a vessel harvesting procedure. For example, the manipulation device 12 can include components (e.g., buttons, knobs, handles, dials, and actuators) on a proximal portion of the device 12 positioned at similar locations and having similar structures to components of the medical tool, such as the vessel harvesting device. The representative components can be manipulated by the user 14 to gain experience manipulating components of the actual medical tool. As described in further detail herein, the manipulation device 12 can further includes sensors 18, such as motion sensors, encoders, time-of-flight sensors, accelerometers, gyroscopes, potentiometers, switches, strain gauges, pressure sensors, and similar electronic sensors 18 for detecting movement of the manipulation device 12 by the user 14. For example, sensors 18 can be configured to detect movement of the manipulation device 12 in different directions (e.g., up, down, right, left), movement of a component or part of the manipulation device 12 relative to another component or part of the manipulation device 12, or pressing of buttons, switches, knobs, or dials of the manipulation device 12.

Figure 1B:
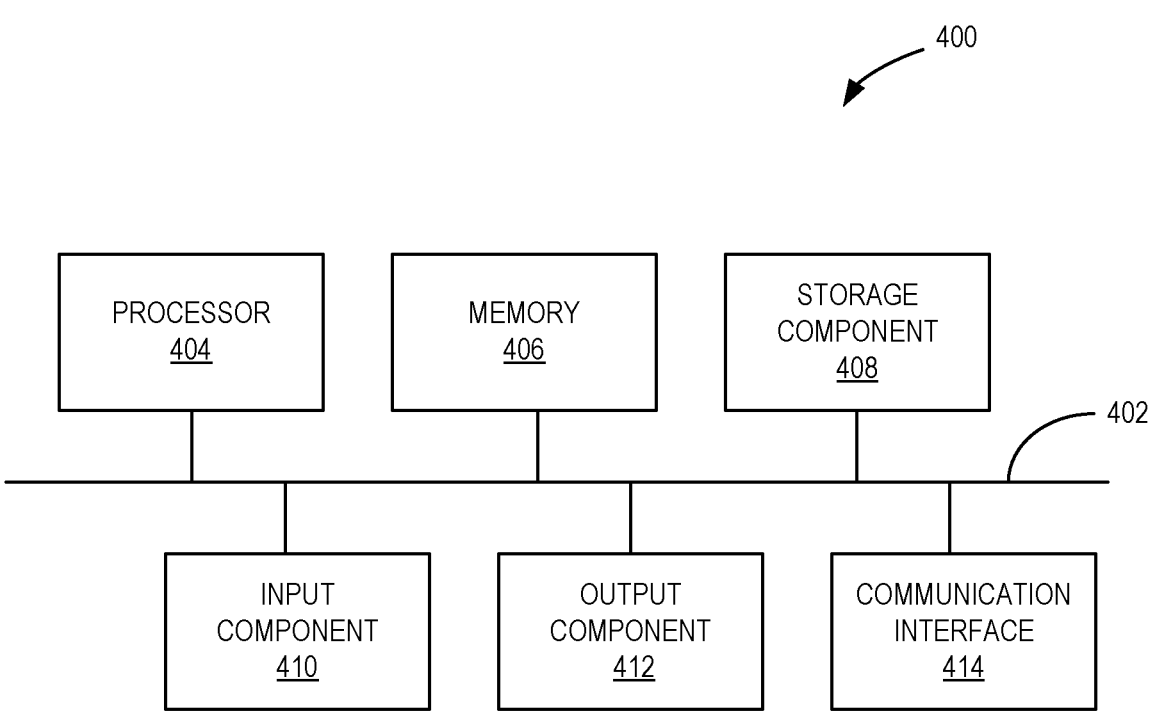
FIG. 1B is a schematic drawing of a computer device or controller of the training system, according to an aspect of the present disclosure.
Figure 1C:
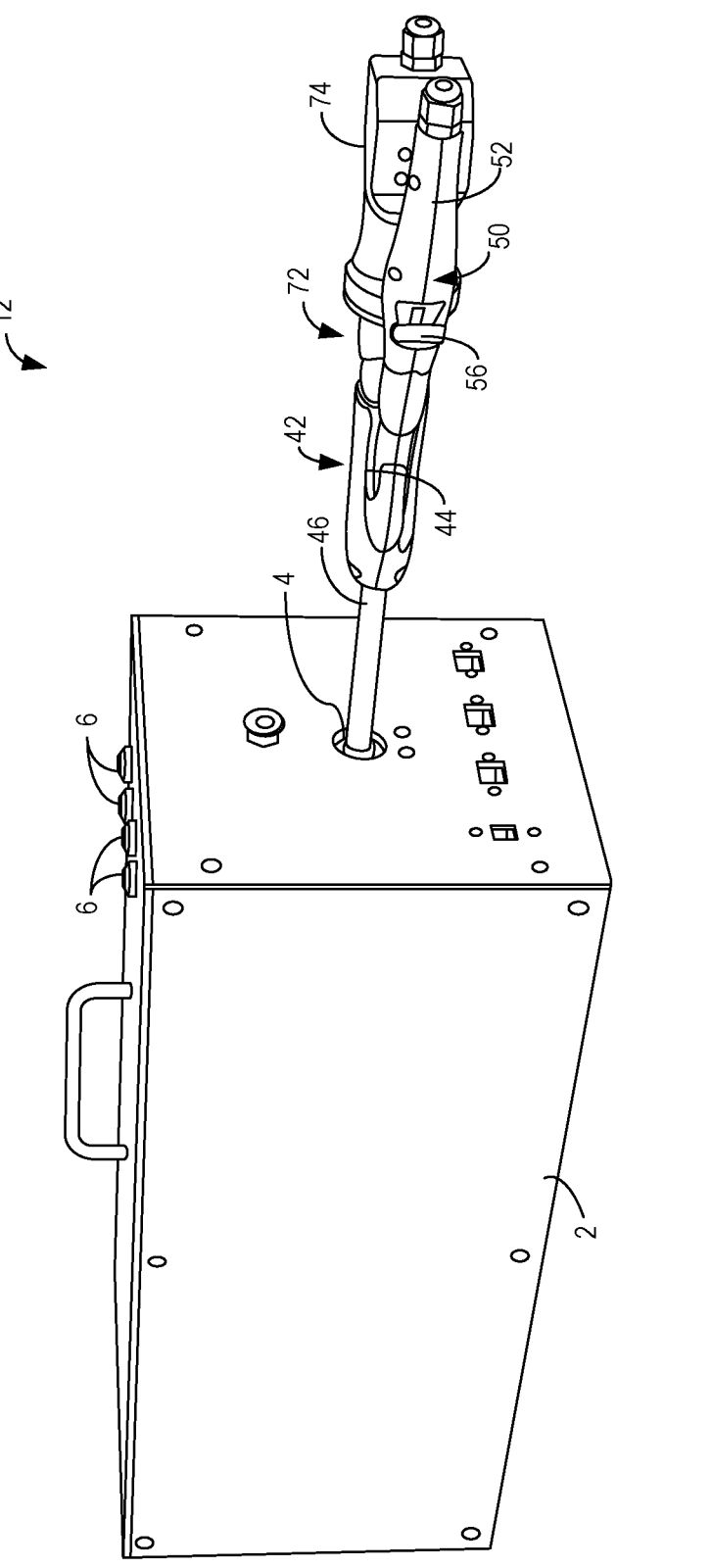
FIG. 1C is a perspective view of a training system including a manipulation device and housing, according to an aspect of the present disclosure.
Figure 1D:
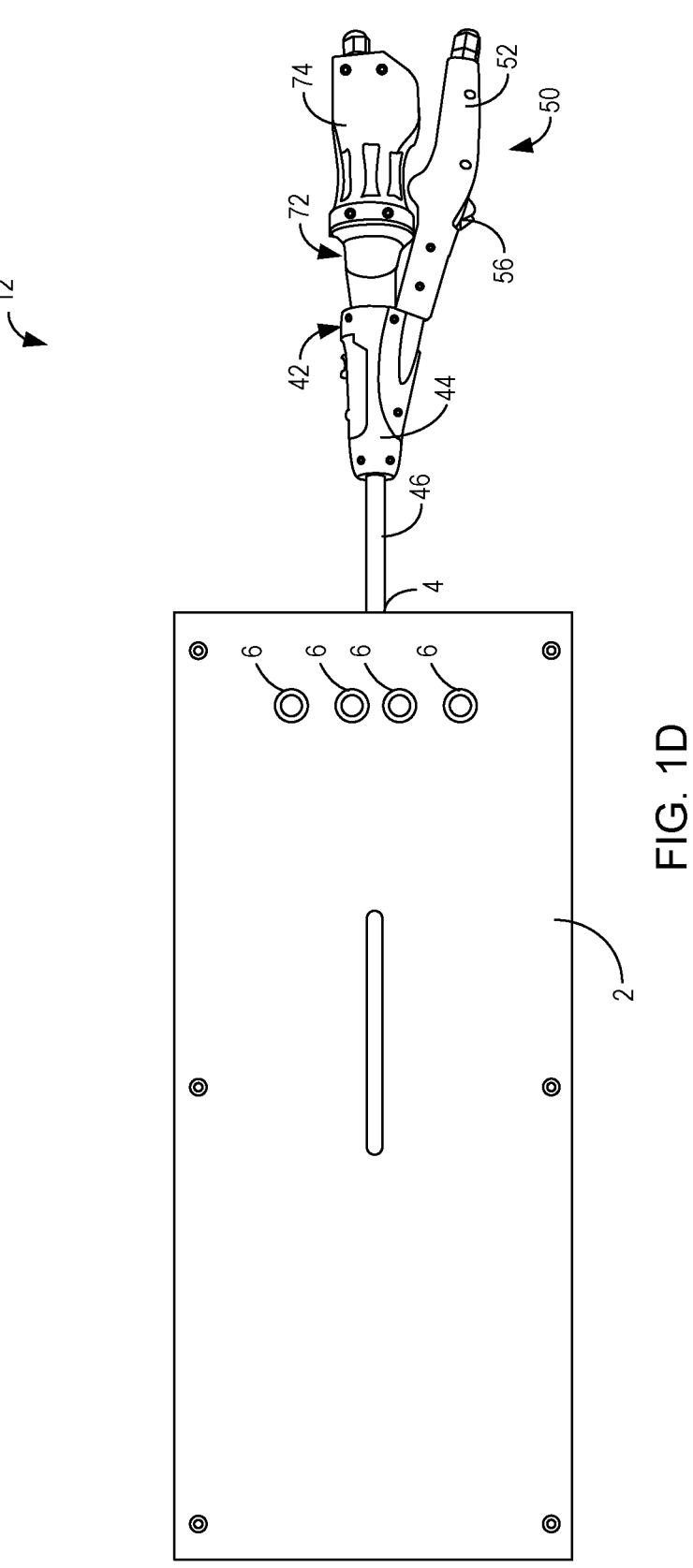
FIG. 1D is a top view of the manipulation device and housing of FIG. 1C.
Figure 2A:
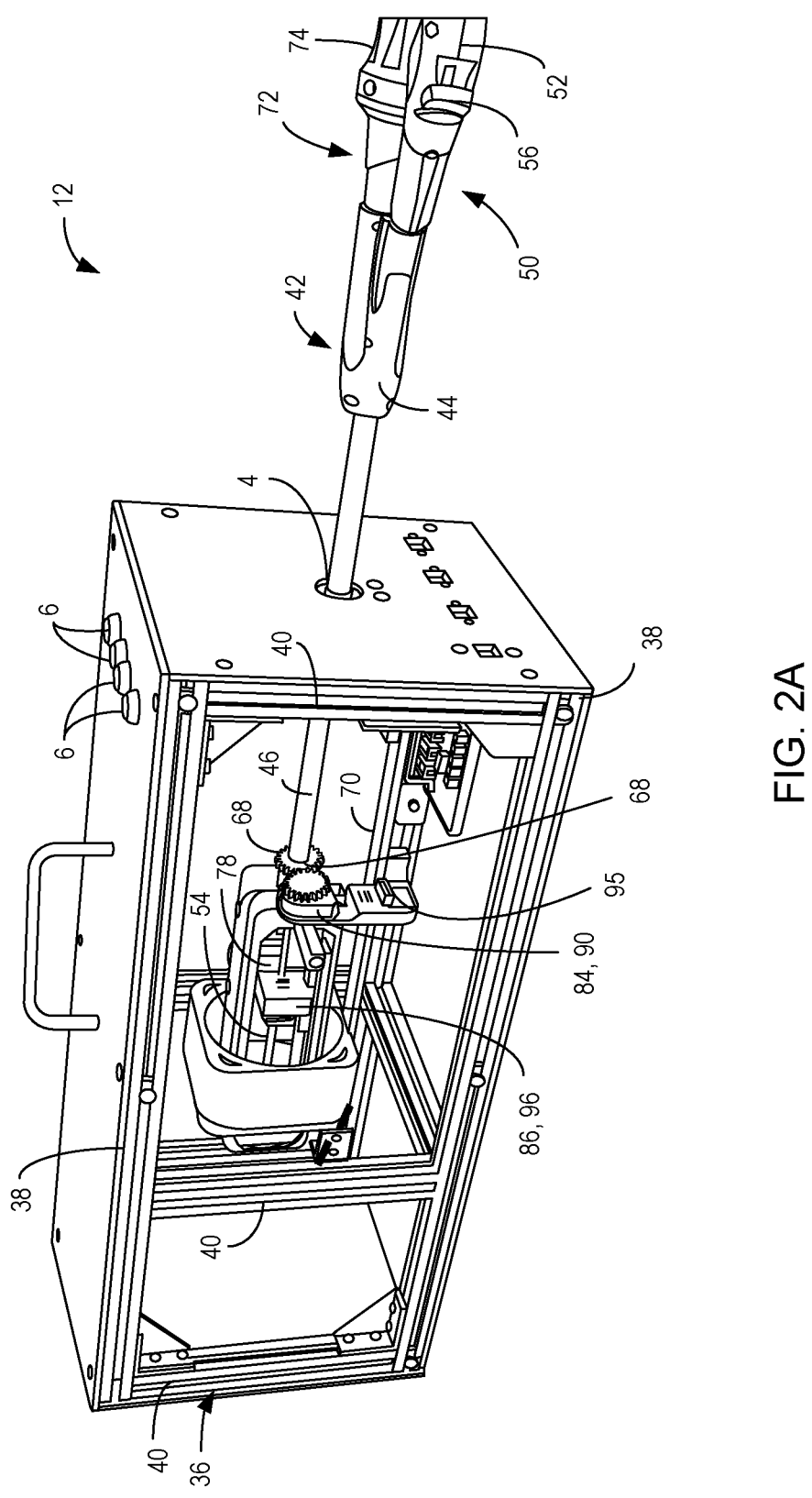
FIGS. 2A and 2B are perspective views of the training system and manipulation device of FIG. 1C with a cover partially removed, according to an aspect of the present disclosure.
Figure 2B:
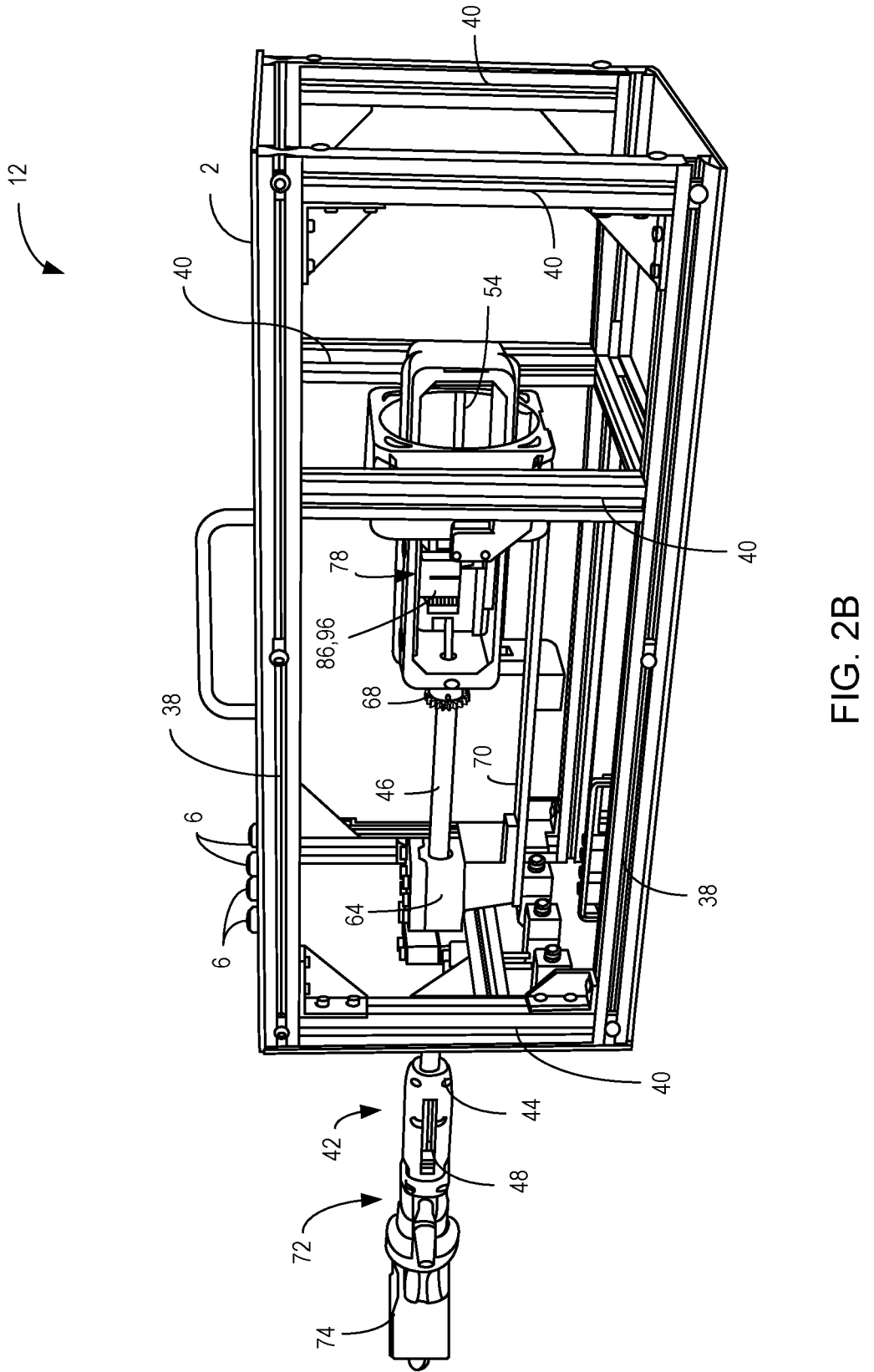
Figure 2C:
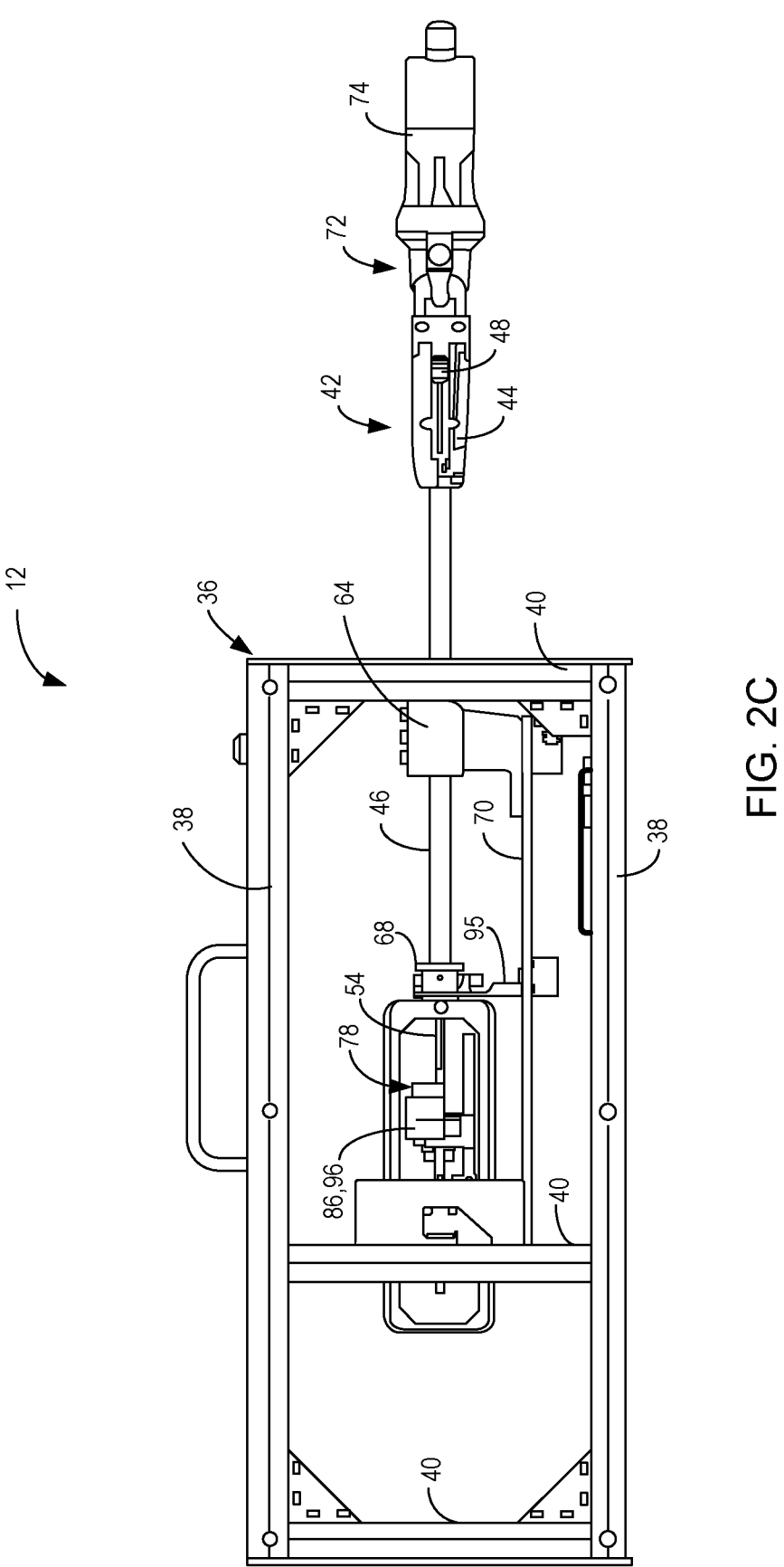
FIG. 2C is a side view of the training system and manipulation device of FIG. 1C with the cover partially removed.
Figure 2D:
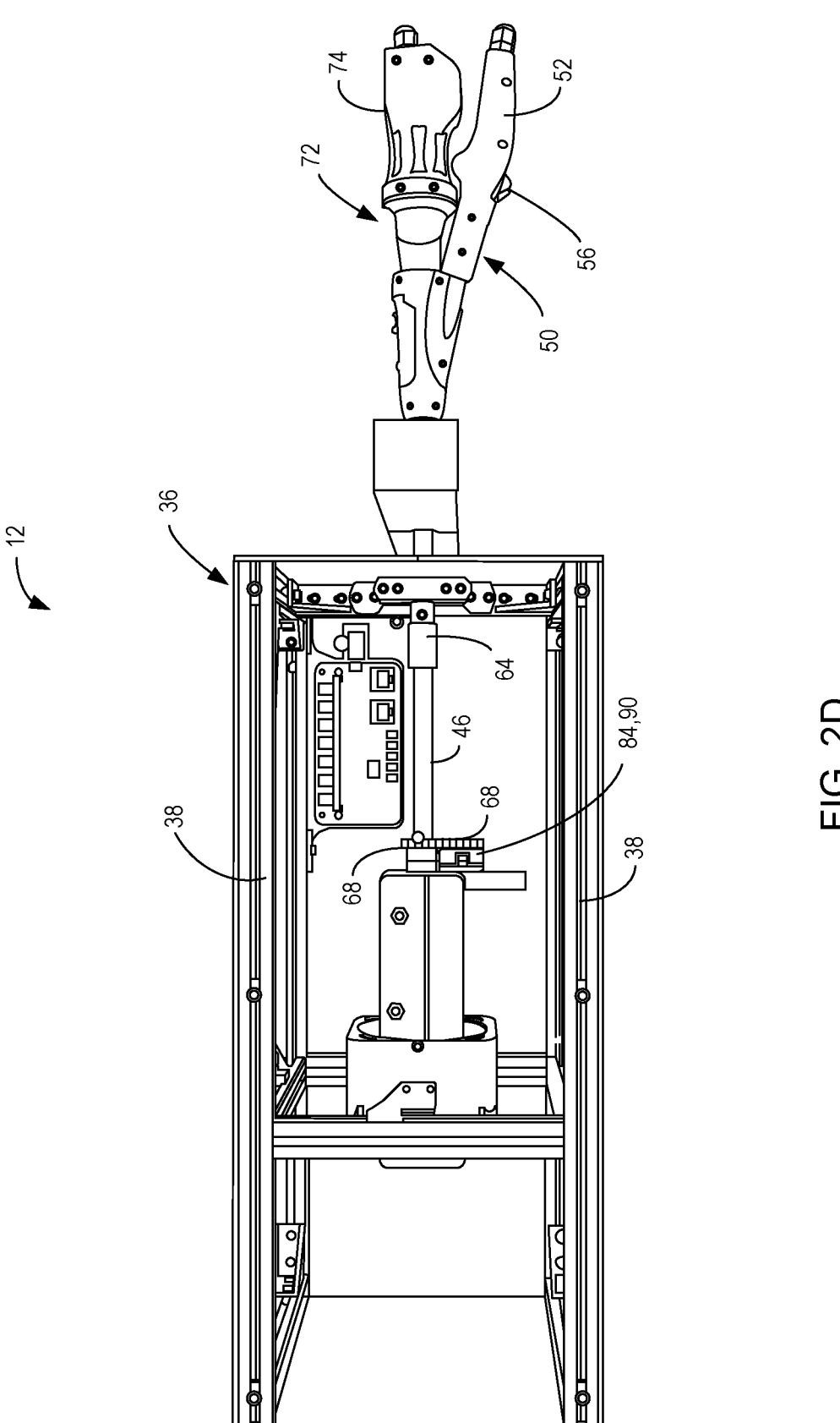
FIG. 2D is a top view of the training system and manipulation device of FIG. 1C with the cover partially removed.

The training system 10 further comprises a system controller 20 and feedback device 22 electrically coupled to and in electronic communication with the sensors 18 of the manipulation device 12. For example, the system controller 20 can be a computer, video game device or console, or similar electronic device configured to control and display aspects of the video game. With reference to FIG. 1B, in some examples, the system controller 20 can be a computer device 400 configured to receive and process information from the sensors 18 of the manipulation device 12. The computer device 400 can include, for example, a bus 402 for communication of data between different components of the computer device 400, a computer processor 404, memory 406, a storage component 408, an input component 410, an output component 412, and a communication interface 414. In some examples, the computer processor 404 can be implemented in hardware, software, or a combination of hardware and software. For example, the computer processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. The memory 406 can include random access memory (RAM), read-only memory (ROM), and/or another type of dynamic or static storage device (e.g., flash memory, magnetic memory, optical memory, etc.) that stores information and/or instructions for use by the computer processor 404.

The storage component 408 may store information and/or software related to the operation and use of the computer device 400 or, for example, may store graphical and other elements of the video game. The storage component 408 can include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

The communication interface 414 may include a transceiver-like component (e.g., a transceiver, a separate receiver and transmitter, etc.) that enables the computer device 400 to communicate with other devices, such as with the manipulation device 12 and/or other electrical devices of the training system 10. The communication interface 414 can include, for example, a wired connection, a wireless connection, or a combination of wired and wireless connections. The communication interface 414 can permit the computer device 400 to receive information from another device and/or to provide information to another device. For example, the communication interface 414 can include an Ethernet interface, an optical interface, a coaxial interface, an infrared interface, a radio frequency (RF) interface, a universal serial bus (USB) interface, a Wi-Fi® interface, a cellular network interface, and/or the like.

The computer device 400 can be configured to perform one or more processes described herein including, for example, displaying and controlling interactive animations of the video game. The computer device 400 can perform these processes based on execution of software instructions by the processor 404 (e.g., a central processing unit (CPU), a graphics processing unit (GPU), etc.). The software instructions can be stored, for example, by a computer-readable medium, such as the memory 406 and/or the storage component 408. A computer-readable medium (e.g., a non-transitory computer-readable medium) is defined herein as a non-transitory memory device. A non-transitory memory device includes memory space located inside of a single physical storage device or memory space spread across multiple physical storage devices. When executed, software instructions stored in the memory 406 and/or the storage component 408 may cause the computer processor 404 to perform one or more processes described herein. Additionally or alternatively, hardwired circuitry may be used in place of or in combination with software instructions to perform one or more processes described herein. The memory 406 and/or storage component 408 may include data storage or one or more data structures (e.g., a database, etc.). The computer device 400 may be capable of receiving information from, storing information in, communicating information to, or searching information stored in the data storage or one or more data structures in the memory 406 and/or the storage component 408.

With reference again to FIG. 1A, the feedback device 22 can include a video display 30, such as a television screen, computer monitor, wearable augmented reality display, virtual reality display, or similar display device that displays or projects aspects of the video game, such as interactive animation videos, within the user's field-of-view. The feedback device 22 can also include or be electrically connected to other output components, such as speakers 32, for providing audio output, or haptic output components, such as vibrating motors 34 included, for example, in a wearable headset of an augmented reality or virtual reality device or computer system.

The system controller 20 is electrically connected to and configured to receive and process signals from the sensors 18 of the manipulation device 12 to detect or determine movement information for the manipulation device 12. Following receipt and processing of the signals from the sensors 18, the system controller 20 is configured to modify or adjust aspects of the interactive animation videos displayed on the video display 30. For example, the system controller 20 can cause visual indication(s) to be provided on the video display 30 of the feedback device 22 at positions determined based on the detected movement information. The visual indication(s) displayed on the video display 30 can include representations of portions of the manipulation device 12, such as cutters, hooks, and other tools of the manipulation device 12. The visual indication(s)

displayed on the video display 30 can also include objects, such as obstructions or walls, which the user 14 should avoid, and targets that the user 14 is instructed to move towards, contact, or follow. In addition to the visual indication(s) that are positioned and/or move in response to the detected movement information, the feedback device 22 can also cause background images of, for example, a particular fantasy scene to be displayed on the video display 30 along with the visual indications of the interactive video animation.

The visual indications and the background images shown on the video display 30 can relate to and/or include, for example, aspects of a cartoon, make-believe, or fantasy world including virtual characters and objects. The environment, characters, and objects of the fantasy world can all relate to a particular video game theme (e.g., animal worlds, nautical themes, fairy tales, mythology, etc.) for enhancing entertainment value and aesthetic appearance of the video game. In many cases, as previously described, the fantasy world of the video game does not resemble a surgical procedure and does not include virtual objects that closely resemble anatomical structures observable during a medical procedure, at least for early levels of the video game. Later levels may include images that more closely resemble anatomical structures or may require the user 14 to perform movements that more closely correspond to movements performed by medical personnel during a medical procedure, such as the vessel harvesting procedure.

Manipulation Device or Dexterity Training Device

As previously described, the manipulation device 12 or dexterity training device is configured to resemble the vessel harvesting device used by medical personnel to perform the vessel harvesting procedure. For example, the manipulation device 12 can be the same size and shape as the vessel harvesting device used for surgical procedures. The manipulation device 12 also can function in the same way and can include many of the same components, such as the same buttons, knobs, and dials, in the same locations as a real-world vessel harvesting device. More specifically, proximal portions of the manipulation device 12 can be made to resemble proximal portions of the vessel harvesting device that are manipulated by the user 14. It is understood, however, that such representative structures of the manipulation device 12 may not include many functional components of the actual vessel harvesting device. For example, the manipulation device 12 may not include many ports, mechanical connectors, electronic devices, and other components found in the actual vessel harvesting tool. Instead, the manipulation device 12 may only include handles, buttons, switches and similar components providing a similar look and feel to components found on the actual vessel harvesting device. Further, the manipulation device 12 may not include most distal portions of the vessel harvesting device that are not touched or manipulated by the user 14.

Figure 3A:
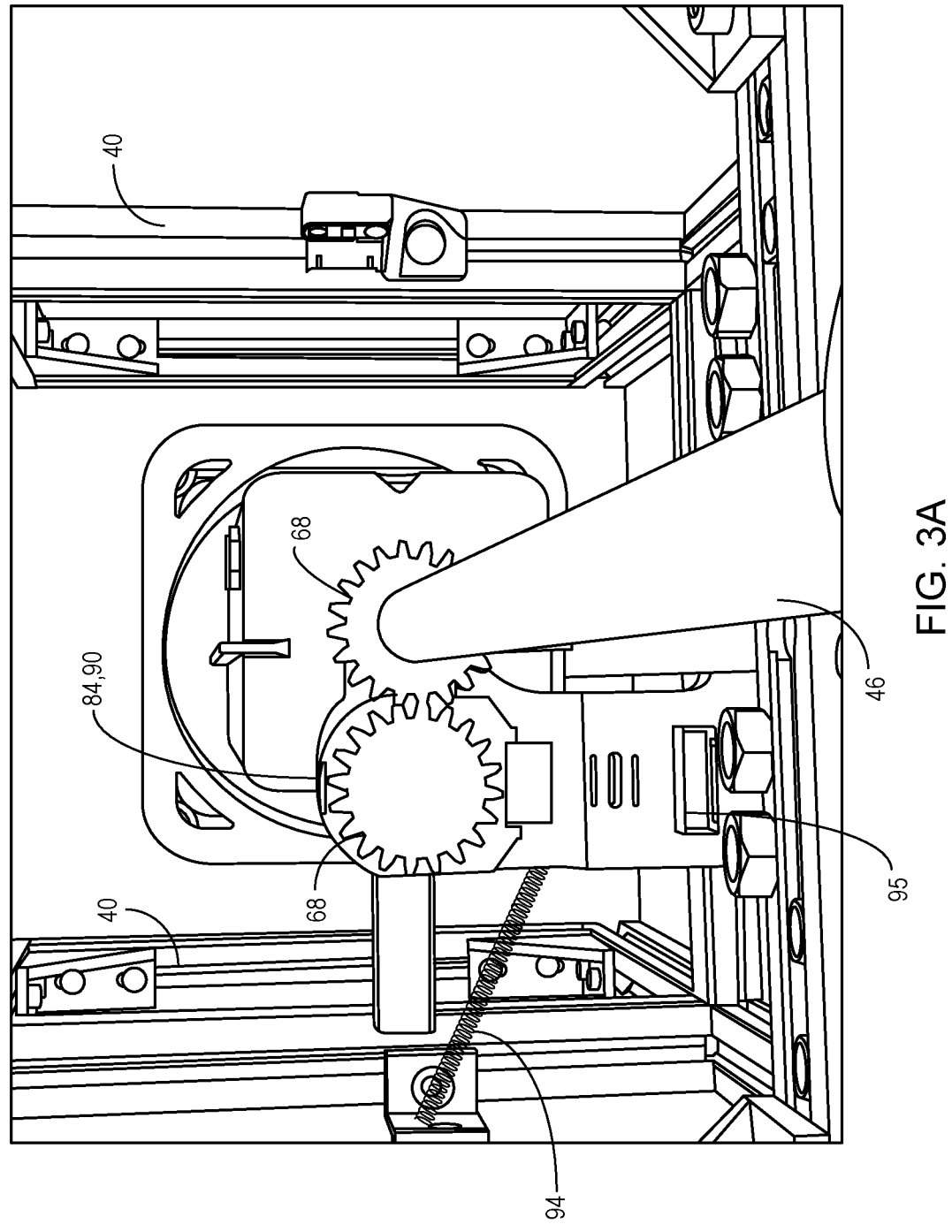
FIGS. 3A-3C are enlarged views showing electrical and mechanical components of the manipulation device contained within the device housing, according to aspects of the present disclosure.
Figure 3B:
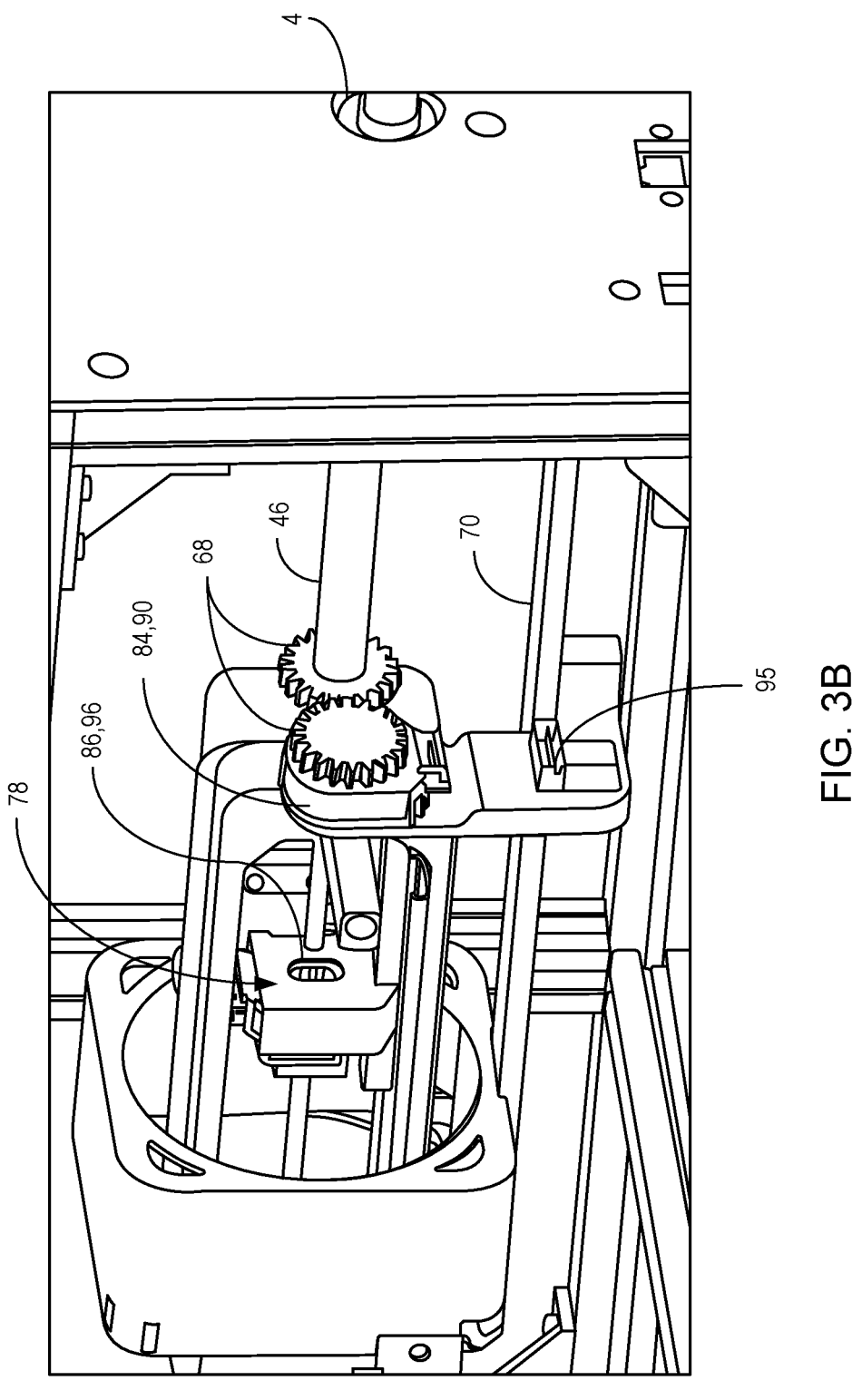
Figure 3C:
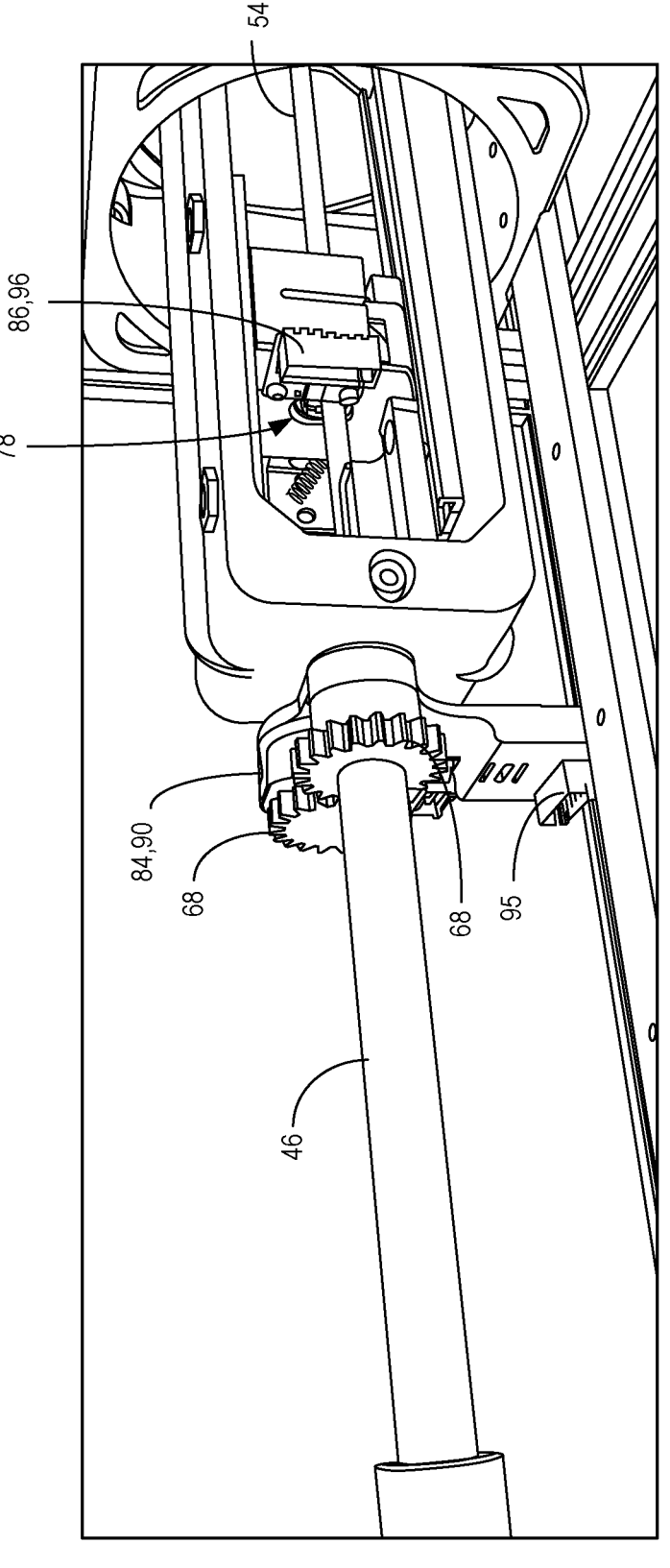

Non-limiting examples of manipulation devices 12, which can be used with the training system 10 and video game software of the present disclosure, are shown in FIGS. 1C-3C. FIGS. 4A and 4B are schematic drawings showing portions of a vessel harvesting device represented by the manipulation device 12. The manipulation devices 12 in FIGS. 1C-3C can be representative of two-tool vessel harvesting device. For example, the manipulation device 12 can be made to resemble and mimic functions of a commercially available vessel harvesting device, such as the Vasoview Hemopro or Hemopro 2 EVH device by Maquet Cardiovascular LLC (Getinge AB). In other examples, the manipulation device 12 can be made to resemble other surgical tools, such as vessel harvesting devices by other manufacturers. Devices by other manufacturers may include different arrangements of buttons, knobs, tubes, sheathes, and other components in different locations from the Vasoview Hemopro or Hemopro 2 devices. Therefore, manipulation devices 12 made to resemble devices by other manufacturers may have a different appearance or functionality than the device shown in FIGS. 1C-3C. It is also understood that the training system 10 and video game software of the present disclosure may be modified for use with these other device designs, so that medical personnel can train with and practice using medical devices, such as vessel harvesting devices, used at the medical facilities where they practice.

In some examples, the manipulation device 12 includes a housing 2 (shown in FIGS. 1C and 1D), such as a rectangular housing or box, comprising a stationary frame 36 (shown in FIGS. 2A-2D) that supports other parts of the manipulation device 12 so that the manipulation device 12 can be moved and repositioned by the user 14. The housing 2 can be formed from plates or sheets of metal or rigid plastic mounted or connected to the stationary frame 36 and other components of the manipulation device 12. The housing 2 can include an opening 4 through one of the plates or sheets. A portion or portions of the manipulation device 12 that are manipulated by the user 14 pass through the opening 4. The housing 2 also includes control buttons 6 for controlling functions of the training system 10. For example, the control buttons 6 can be used for turning on/off components of the training system 10, such as the manipulation device 12 or other devices, scrolling through menu items, or for entering selections and other user inputs.

The housing 2 and/or stationary frame 36 of the manipulation device 12 can be positioned on a flat raised surface, such as on the table 16 (shown in FIG. 1A), at about waist height for the user 14. The stationary frame 36 can include horizontal members 38 (shown in FIGS. 2A and 2B) and vertical members 40 extending between the horizontal members 38. The manipulation device 12 also includes an outer or first tool 42 that resembles an outer sheath of a vessel harvesting device, which is slideably connected or mounted to one of the housing 12 or stationary frame 36. The outer or first tool 42 includes a main handle 44 configured to be grasped by the user 14, a hollow tube 46, such as a tube formed from metal or rigid plastic, extending from the main handle 44, a rotatable handle 72 rotatably connected to the main handle 44 and connected to a camera head 74, and a first button 48 (shown in FIGS. 2B, 2C, and 4A-8B), such a slider, knob, toggle, or switch, on the main handle 44. The rotatable handle 72 can be representative of a bell housing or bell portion of a vessel harvesting device. The rotatable handle 72 and/or camera head 74 can also include features representative of an endoscope port and/or camera port of the vessel harvesting device. For convenience, the structure of the manipulation device 12 representative of the bell housing or bell portion and/or endoscope port are referred to herein as the rotatable handle 72. However, it is understood that the manipulation device 12 can include multiple parts or portions connected together to represent the bell housing, endoscope port, camera port, and/or camera head. The first button 48 can be configured to control extension, retraction, and/or positioning of a dissection tool, vein guide tool, vessel cradle, and/or c-ring. For example, the first button 48 can be a slider positioned within the proximal portion of the main handle 44 that controls extension and retraction of a c-ring, which would be positioned at a distal end of a hollow tube of an actual vessel harvesting device. In some examples, the first tool 42 can be used to manipulate a dissection tip, which can be attached to a distal end of a vessel harvesting device. While not shown in the video game and feedback examples of the present disclosure, a game level could be added allowing the user 14 to practice dissection using a dissection tip attached to a vessel harvesting device. For example, the game could be configured to show images of objects representative of a dissection tip to allow the user 14 to practice tissue dissection using a vessel harvesting device.

The manipulation device 12 further includes an inner or second tool 50 configured to slide through the main handle 44 and hollow tube 46 of the outer or first tool 42. The inner or second tool 50 can include an auxiliary handle 52 configured to be grasped by the user 14, a shaft 54 (shown in FIGS. 2A-2C and FIG. 4B) inserted through an opening in the main handle 44 and movable through the hollow tube 46 of the first tool 42, and a second button 56, such as an activation toggle or activation button, on the auxiliary handle 52.

As described in further detail herein in connection with FIGS. 5A-8B, the entire manipulation device 12, as well as individual parts (e.g., the outer or first tool 42 and the inner or second tool 50) of the manipulation device 12, are configured to move in a wide variety of directions and movement patterns. For example, the entire manipulation device 12 can be moved forward or backward through the stationary frame 36. The entire manipulation device 12 can also be twisted or rotated relative to the stationary frame 36. The entire manipulation device 12 can also be pivoted about a pivot point. In addition, the inner or second tool 50 can be moved relative to the outer or first tool 42. For example, the inner or second tool 50 can be twisted or rotated about or relative to the first tool 42. Also, the inner or second tool 50 can be inserted into or retracted from the hollow tube 46 of the outer or first tool 42.

The manipulation device 12 can also include representations of connectors or ports 58 (shown in FIG. 4A) configured to be attached to a fluid or suction source for applying liquids or air to a surgical site and/or for removing fluids from the surgical site. When the user 14 presses a button or performs another action to apply a liquid through the port 58, a stream of water can be displayed in the video game on the video display 30. In some examples, the video game may guide or encourage the user 14 to produce a stream of water to, for example, water a plant or douse flames of a fire displayed on the video display 30 in order to train the user to use the fluid and suction sources.

The manipulation device 12 also includes the sensors 18 (shown in FIG. 1A) positioned on or proximate to the manipulation device 12 that detect, for example, movement of the manipulation device 12, movement of the first tool 42, movement of the second tool 50 (e.g., movement of the second tool 50 relative to the first tool 42), or pressing or moving of the first button 48 or the second button 56. For example, the manipulation device 12 can include motion sensors 80 (shown in FIG. 1A), such as an encoder, time-of-flight sensor, accelerometer, or gyroscope, for detecting orientation, position, or movement of the entire manipulation device 12 or movement of components of the manipulation device 12 (e.g., the first tool 42 or the second tool 50) relative to each other. In some examples, the motion sensors 80 can also detect rotation of the entire manipulation device 12 about a longitudinal axis of the manipulation device 12, pivoting of the entire manipulation device 12 about a pivot point, or linear movement of the manipulation device 12 in one or more directions. The motion sensors 80 can also include a linear potentiometer or voltage divider positioned to sense movement of the inner or second tool 50, such as movement of the inner or second tool 50 relative to the outer or first tool 42.

In some examples, the manipulation device 12 can include multiple motion sensors 80 for detecting comparative movement (e.g., movement of one part or component of the manipulation device 12 relative to another part or component of the manipulation device 12). For example, the manipulation device 12 can include a first encoder, time-of-flight sensor, accelerometer, and/or gyroscope on the first tool 42 and a second encoder, time-of-flight sensor, accelerometer and/or gyroscope on the second tool 50. In such cases, the system controller 20 can be configured to calculate or determine movement information for the manipulation device 12 based on differences in signals detected by the first encoder, time-of-flight sensor, accelerometer, or gyroscope and the second encoder, time-of-flight sensor, accelerometer, or gyroscope.

In some examples, the manipulation device 12 also includes button sensors 82 (shown in FIG. 1A) for detecting movement (e.g., pressing, sliding, or release) of the first button 48 or the second button 56. For example, the button sensor 82 can be a switch that opens or closes a circuit when pressed by the user 14. In other examples, the button sensors 82 can be a contact sensor, pressure sensor, accelerometer, or proximity sensor, configured to detect movement (e.g., sliding, pressing, or contacting) of the first button 48 or the second button 56. The system controller 20 can be configured to receive and process signals from the button sensor 82 to detect the movement (e.g., pressing, sliding, or release) of the first button 48 or the second button 56, and to modify a position of visual indication(s) and other virtual objects on the video display 30 based on the detected movement (e.g., pressing, sliding or release) of the first button 48 or the second button 56.

The first button 48 and the second button 56 are generally configured to cause virtual indications or icons in the video game to move in a manner and/or to perform functions similar to those that occur when a user slides or presses a button on a real-life medical device, such as a real-life vessel harvesting device. For example, the first button 48 of the first tool 42 (shown in FIG. 4A) can represent a slider that extends or retracts a vessel cradle 60 (shown in FIG. 4B), also be referred to as a vein guide tool or c-ring, extending from a hollow tube of an actual vessel harvesting device. The transection portion utilizes a cannula and a specific harvest tool 62 controlled by a second button 56. The second button 56 of the second tool 50 can represent a button that controls a gripper/cutter tool, such as jaws of a harvest tool 62 (shown in FIGS. 4A and 4B) configured to separate branched vessels or other objects. The harvest tool 62 can be a separate tool that functions independently from the vessel cradle 60 and allows for extension, retraction and rotation of jaws at a distal end of the harvest tool 62. For example, pushing on the second button 56 or activation toggle can cause the jaws of the harvest tool 62 to open, while pulling or slight retraction of the second button 56 can close the jaws of the harvest tool 62. Continued retraction of the second button 56 or activation toggle can cause the jaws of the harvest tool 62 to cut and/or seal tissue of the branched vessels or cut other objects.

In some examples, the manipulation device 12 can further include a resistor 64 (shown in FIGS. 2B-2D), biasing member, or spring engaged between components of the manipulation device 12 for restricting movement of one part of the manipulation device 12 relative to another part of the manipulation device 12. For example, the resistor 64 or another biasing member can be engaged or coupled between the first tool 42 and the second tool 50, and configured to provide resistance to movement of the second tool 50 relative to the first tool 42. In some examples, the resistor 64 can include a gear assembly including a gear mounted to and configured to travel along a track 70 as the shaft 54 of the second tool 50 is inserted into the hollow tube 46 of the first tool 42. The track 70 can be configured to restrict or counteract rotation of the gear 68, thereby providing resistance to movement of the second tool 50 relative to the first tool 42.

In some examples, the resistance provided by the resistor 64 can be variable and controlled, for example, by the system controller 20 to mimic or to be responsive to movements by the user 14 and/or to virtual objects displayed in the video game. For example, the system controller 20 can be configured to increase resistance between the first tool 42 and the second tool 50 when the user's character in the video game passes through viscous material or rough terrain, such as when the character passes through fluids, liquids, swamps, sand, hills, valleys, or other rough terrain. Resistance may also be substantially increased when the user's character contacts or runs into a virtual solid surface in the video game, such as a wall, baffle, tree, or other objects that may impede forward movement of the user's character in the video game. The increase in resistance can signal to the user 14 that the manipulation device 12 has contacted a blocked area and that the user 14 should move the manipulation device 12 in another direction. Resistance can be decreased when, for example, the user's character passes over a slick surface or moves down a slope. Similarly, when the training system 10 and manipulation device 12 are used to provide a surgical simulation, as may occur during a final level or chapter of the video game, the system controller 20 can be configured to modify resistance of the resistor 64 in a way that mimics how the medical device, such as the vessel harvesting device, feels to a user 14 while performing the medical procedure. For example, resistance may increase as the medical device (e.g., the vessel harvesting tool) moves through body tissue. When the medical device is in a body space or cavity, resistance may decrease.

In some examples, appropriate levels of resistance for different aspects of the vessel harvesting procedure can be determined by, for example, using sensor(s) to monitor pressure applied to a medical device by a user 14 during performance of an actual medical procedure. For example, data sensed by motion and pressure sensors during the actual medical procedure can be used to adjust movement patterns, resistance feedback, and other features of the video game of the present disclosure in order to provide a virtual experience in which the user 14 practices skills and gains experience using a manipulation device 12 that looks, feels, and performs as much like a real world device as possible.

In some examples, the manipulation device 12 can also include resisting or biasing structures mounted to the housing 2 or stationary frame 36 that resist movement of the tools 42, 50 giving the manipulation device 12 a more realistic feel and/or providing tactile feedback when the user 14 attempts to move one of the tools 42, 50 beyond a maximum movement distance in any direction. For example, the housing 2 or stationary frame 36 can include one or more bearings positioned proximate to the opening 4 of the housing 2 or at other locations in the housing 2 that interact with the hollow tube 46 of the first tool 42. The bearings can include a linear bearing that provides resistance against back and forward movement and/or rotation of the hollow tube 46. The manipulation device 12 can also include rotational or conventional bearings that provide resistance to pivoting the first tool 42 and/or hollow tube 46 about a central pivot point.

In some examples, the manipulation device 12 also includes the rotatable handle 72 extending from the main handle 44 of the first tool 42 and the camera head 74 attached to the rotatable handle 72. As previously described, the rotatable handle 72 can include or be representative of a bell housing or bell portion, camera port, and/or endoscope port of an actual vessel harvesting device. The rotatable handle 72 and/or camera head 74 can be configured to represent portion(s) of the vessel harvesting device including controls for the endoscope or camera. The rotatable handle 72 and/or camera head 74 can include a camera position sensor 76 (shown in FIG. 1A). The camera position sensor 76 is configured to sense or determine movement or change of position of the rotatable handle 72 and camera head 74, which corresponds to changes in a field-of-view or line-of-sight of an endoscope or camera of the vessel harvesting device. The system controller 20 can be configured to receive and process signals from the camera position sensor 76 to determine an orientation of the camera head 74 relative to the main handle 44. Based on the received and processed information, the system controller 20 can be configured to modify an orientation of a background or camera image provided on the video display 30 to account for changes in the field-of-view or line-of-sight of the camera or endoscope. For example, the system controller 20 can be configured to determine a direction and magnitude of rotation of the camera head 74 relative to the main handle 44 based on the received and processed signals from the camera position sensor 76 or other sensors 18 of the manipulation device 12. The system controller 20 then causes the background or camera image on the video display 30 to rotate to correspond to the determined magnitude and direction of rotation of the camera head 74.

With specific reference to FIGS. 2A-3C, in some non-limiting examples, the manipulation device 12 can include mechanical components, such as gears, tracks, tubes, or sleeves, in combination with sensors, generally identified as sensors 18 in FIG. 1A, for detecting movement of the mechanical components. For example, the manipulation device 12 can include a potentiometer 84 (shown most clearly in FIGS. 3A-3C), such as a 360 degree potentiometer, or encoder 90 for measuring circular movement of hollow tube 46 of the outer or first tool 42. The potentiometer 84 or encoder 90 can be positioned to measure rotation of gears 68, which corresponds to movement of the hollow tube 46. In some non-limiting examples, the manipulation device 12 can also include a multi-directional accelerometer, such as the Bosch BNO055 Intelligent 9-Axis Absolute Sensor manufacture by Robert Bosch GmbH, positioned at a somewhat central location on the manipulation device 12, such as on or proximate to the gears 68. The manipulation device 12 can also include a potentiometer positioned proximate to the track 70 or resistor 64 for measuring linear movement of the manipulation device 12.

In some examples, the manipulation device 12 also includes a rotational potentiometer 86 or encoder 96 (shown by clearly in FIGS. 2A, 2B, 3B and 3C) positioned in a sensor housing 78 at a distal end of the manipulation device 12. The rotational potentiometer 86 or encoder 96 can be configured to measure rotation of the second tool 50 relative to the first tool 42. There can also be a separate linear potentiometer or time of flight sensor 92 (shown in FIG. 3D) or time of flight sensor 95 (shown in FIGS. 2A, 2C, and 3D) in or proximate to the sensor housing 78 for measuring linear movement of the second tool 50. The manipulation device 12 can also include a potentiometer, such as a 360 degree potentiometer, encoder, or time of flight sensor positioned in the camera head 74 for measuring rotation and/or linear movement of the camera head 74.

Figure 3D:
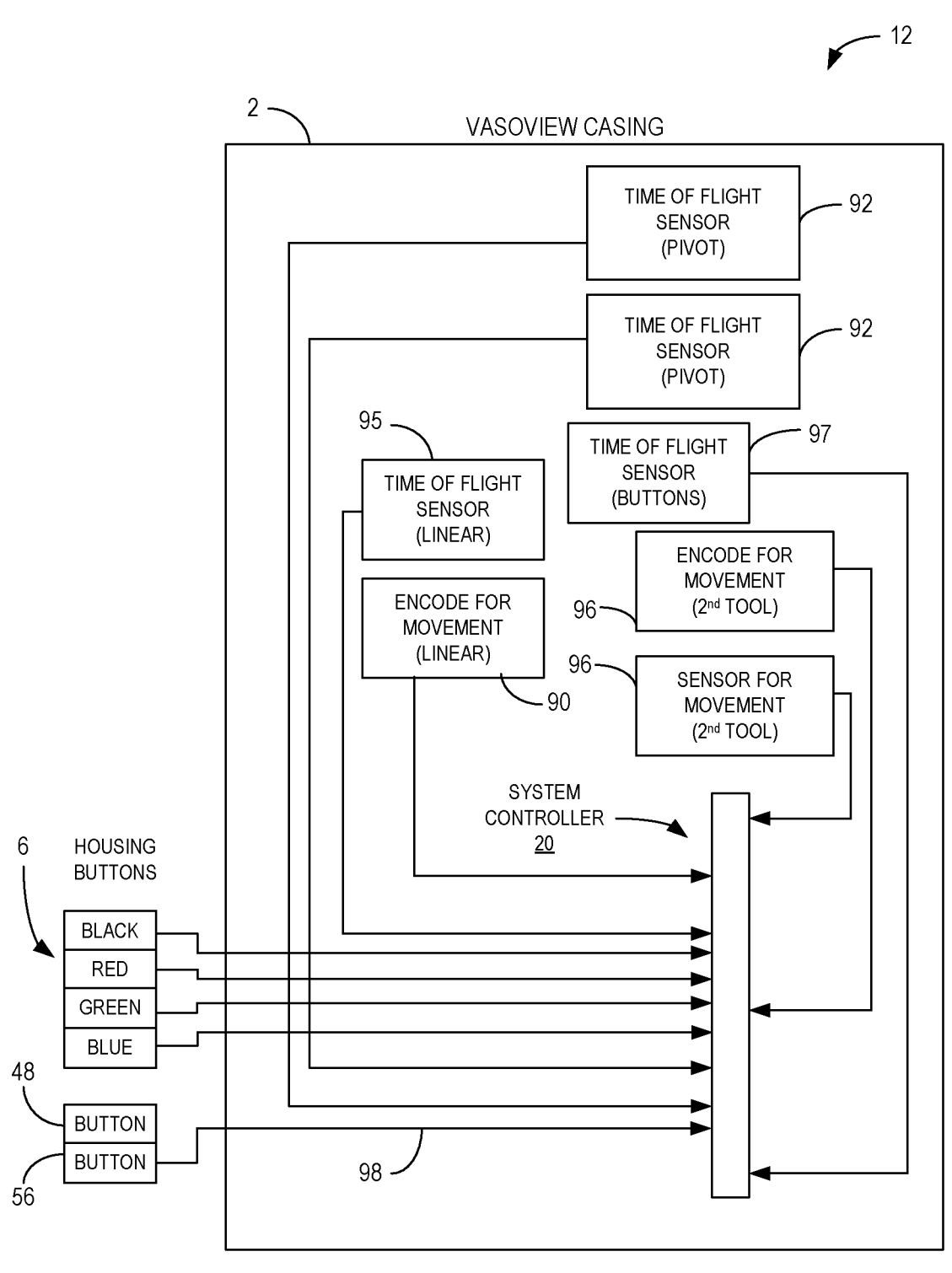
FIG. 3D is a schematic drawing of electrical components of the manipulation device of FIG. 1A, according to an aspect of the present disclosure.
Figures 4A, 4B:
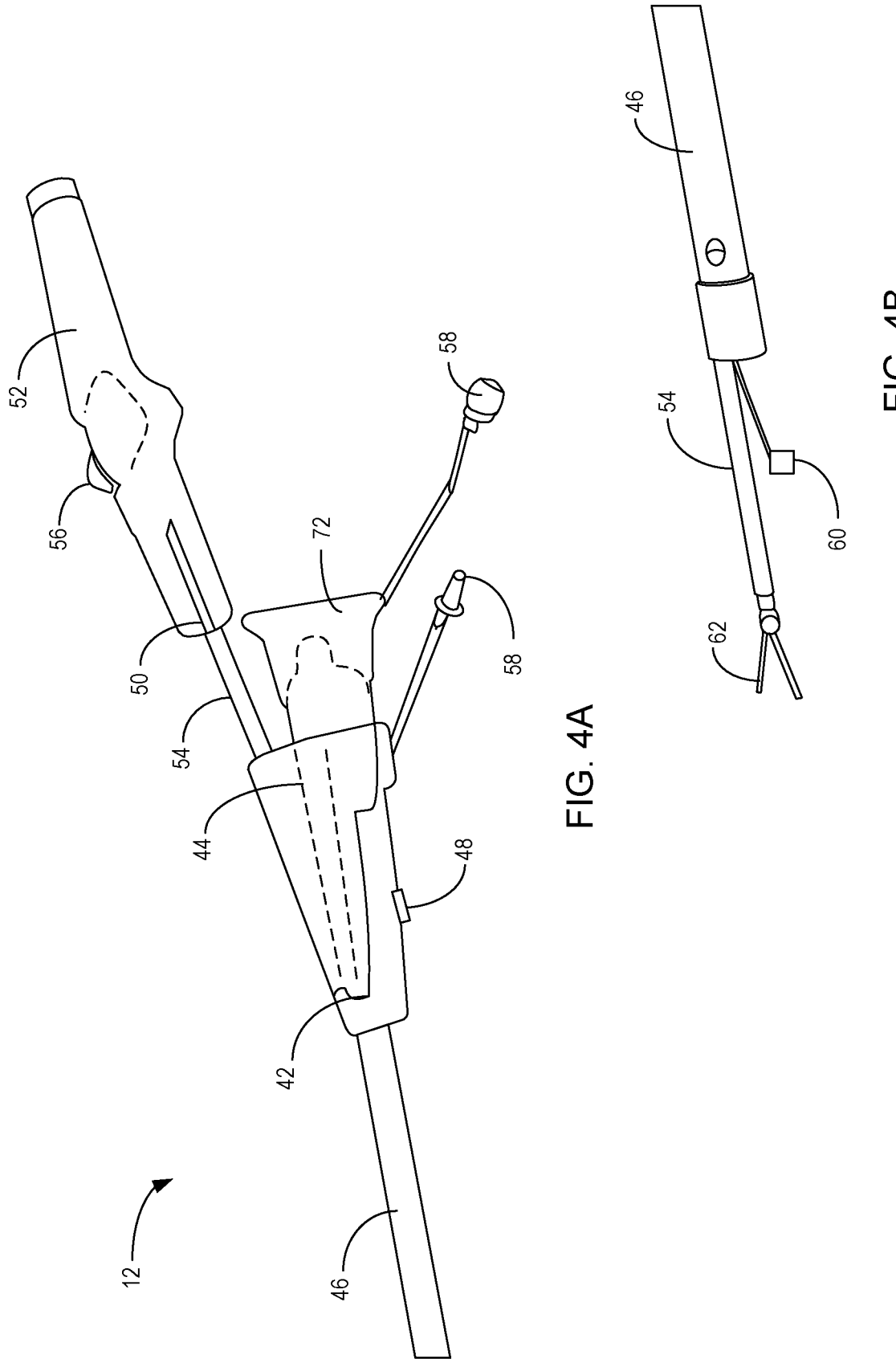
FIGS. 4A and 4B are schematic drawings of proximal and distal portions of a vessel harvesting tool, which is represented by the manipulation device of FIG. 1A, according to an aspect of the present disclosure.

FIG. 3D is a schematic drawing showing a sensor arrangement for a non-limiting embodiment of a manipulation device 12. As shown in FIG. 3D, the manipulation device 12 can include a first encoder sensor 90 (also shown in FIGS. 2A-3C), which can be positioned in proximity to the hollow tube 46, potentiometer 84 (if present), or gears 68, for detecting rotational or circular movement of the complete manipulation device 12. An encoder sensor is an electromechanical sensor that creates a digital signal representative of linear motion (e.g., velocity and direction) or rotational motion. In some examples, the first encoder sensor 90 can be positioned at a fixed location proximate to the hollow tube 46 for detecting rotation of the hollow tube 46. In some examples, rotation of the first tool 42 and hollow tube 46 can be constrained preventing a user from rotating the first tool 42 or entire manipulation device 12 by a full turn. In some examples, the first encoder sensor 90 can be a 14-bit rotary encoder, as is known in the art.

The manipulation device 12 can also include a first group or array of time-of-flight sensors 92, which can be mounted, for example, to portions of the stationary frame 36, configured to detect pivotal movement of the first and/or second tools 42, 50 about a central pivot point. The time-of-flight sensors 92 can be, for example, a light sensor that determines a distance between the sensor 92 and an object based on a time required for photons to travel between an emitter and a receiver. Exemplary time-of-flight sensors, which can be used with the manipulation device 12 of the present disclosure are widely available from many commercial manufactures. In some examples, the array of time-of-flight sensors 92 can comprise one or more of the SEN0427 light time-of-flight sensors by DFRobot, though sensors by other manufacturers can also be used for the manipulation device 12. Pivotal movement detected by the array of time-of-flight sensors 92 is shown schematically in FIG. 5A. Specifically, the group of time-of-flight sensors 92 can be configured to detect movement of the tools 42, 50 in both the x and y directions indicating pivoting of the tools 42, 50. In some examples, as shown in FIG. 3A, the manipulation device 12 can also include springs 94 configured to move the first tool 42 back to a neutral or middle position when the user stops grasping and/or attempting to move or pivot the tools 42, 56.

In some examples, the manipulation device 12 can also include a second group or array of time-of-flight sensors 95 (also shown in FIGS. 2A, 2C, and 3A-3C) for measuring linear movement of the first tool 42 and the second tool 50 over a longitudinal axis of the hollow tube 46. Specifically, time-of-flight sensors 95 can be positioned to measure linear movement of the hollow tube 46 as the hollow tube 46 is pushed into or retracted through the opening 4 of the housing 2. The linear movement of the tools 42, 50 is shown schematically in FIG. 5B (arrow A3).

The manipulation device 12 can also include an encoder/time-of-flight sensor assembly 96 (also shown in FIGS. 2A-3C) configured to detect rotational, circular, and/or linear movement of the second tool 50. For example, an encoder/time-of-flight sensor assembly 96 may be positioned near a distal end of the hollow tube 46. The sensor assembly 96 can include an encoder sensor that detects circular movement of the second tool 50. The circular movement is shown schematically by arrow A5 in in FIG. 6A. The encode sensor can have a fixed positioned proximate to the distal end of the hollow tube 46 that detects rotational movement of the hollow tube 46. The sensor assembly 96 can also include a time-of-flight sensor for detecting the linear movement of the second tool 50. This linear movement is shown schematically by arrow A7 in FIG. 6B. In particular, the time-of-flight sensor can be positioned to measure retraction or extension of the shaft 54 of the second tool 50 relative to the hollow tube 46 of the first tool 42.

As previously described, the manipulation device 12 can also include the button sensors 82 (shown in FIG. 1A). For example, the manipulation device 12 can include a linear potentiometer inside the main handle 44 of the manipulation device 12 for measuring sliding movement of the first button 48, which can be a sliding knob or toggle, that moves forward to extend the vessel cradle 60 of the vessel harvesting device and backward to retract the vessel cradle 60 (shown in FIGS. 4A, 4B, and 8A (wherein direction of movement is shown by arrows A9)). The manipulation device 12 can also include a button sensor 82 including a switch for detecting when the user 14 presses the second button 56 on the auxiliary handle 52 of the manipulation device 12.

The manipulation device 12 can also include a button or slider encoder sensor(s) 97 configured to detect movement of the first button 48 or the second button 56. The button encoder sensor(s) 97 can be positioned in the device housing 2 and, as shown in FIG. 3D, can be connected to the buttons 48, 56 by cables or wires 98. The button encoder sensors 97 can be configured to detect movement of the first button 48 as it slides along the handle 44. This sliding movement of the first button 48 is shown schematically in FIG. 8A.

In some examples, the encoders 90 and time-of-flight sensors 92 of the manipulation device 12 need to be calibrated periodically, which can be performed by placing the manipulation device 12 in a calibration mode. In the calibration mode, the user 14 moves the first tool 42 and the second tool 50 along each axis or movement direction between an absolute minimum position and an absolute maximum position to calibrate the manipulation device 12. Recording the minimum and maximum absolute positions establishes an encoder or time-of-flight sensor measurement for the full ranges of movement for each tool 42, 50 of the manipulation device 12 in order to calibrate the device sensors. Once calibration along each axis or movement direction is complete, sensor data from the encoders 90 and time-of-flight sensors 92 can be recorded to determine a relative position for the first tool 42 and/or the second tool 50 relative to each other or relative to other portions of the manipulation device housing 2.

Movement Patterns and Tasks

FIGS. 5A-8B are schematic drawings showing the different types of movement that can be performed by the user 14 with the manipulation device 12, and which can be detected by the sensors 18 of the manipulation device 12. It is noted that some portions of FIGS. 5A-8B, as well as FIG. 4B, show distal portions of a vessel harvesting device, such as the c-shaped ring 60 and harvest tool 62. However, the manipulation device 12 does not actually include such distal structures. Instead, these distal structures are projected on the screen or feedback device showing the user 14 how such structures would move in response to actions performed by the user 14 with the manipulation device 12.

The sensors 18 (shown in FIG. 1A) of the manipulation device 12 can be configured to detect circular movement of the outer or first tool 42. Circular movement of the outer or first tool 42 without rotation of the rotatable handle 72 causes rotation of the hollow tube 46, second tool 50, and/or vessel cradle 60, while preventing rotation of background image. Rotation of the rotatable handle 72 with or without rotation of the outer or first tool 42 causes the camera head 74 to rotate and background image displayed on the video display 30 (shown in FIG. 1A) to rotate. However, the tools 42, 50, remain in the same position relative to one another (e.g., rotation of the outer or first tool 42 does not cause the tools 42, 50, to separate from or rotate relative to one another). Circular movement of the outer or first tool 42 can be detected by, for example, the rotational potentiometer 86, such as a 360 degree potentiometer, positioned on the gears or gear assembly of the resistor 64. As previously described, the rotational movement can also be detected by the encoder sensor 90 shown in FIGS. 3A-3C. In other examples, circular movement or rotation of the outer or first tool 42 can be measured by, for example, a tilt sensor, induction sensor, and/or a Hall Effect sensor mounted, for example, to the hollow tube 46 and/or to other structures of the stationary frame 36 or housing 2 in proximity to the hollow tube 46.

Figure 5A:
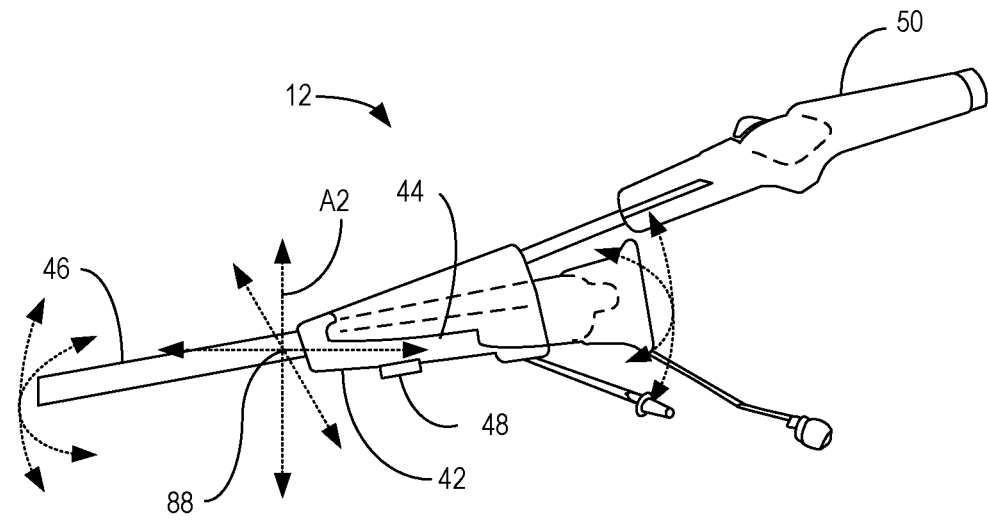
FIGS. 5A-5C are schematic drawings showing movements for an entire manipulation device, according to aspects of the present disclosure.

As shown in FIG. 5A, sensors 18 of the manipulation device 12 can also be configured to detect pivotal movement of the entire manipulation device 12 around a central pivot point 88, which moves the manipulation device 12 in at least two dimensions (e.g., in both a vertical (z) direction and a horizontal (x) direction) as shown by arrows A2 in FIG. 5A. Pivotal movement of the entire manipulation device 12 causes the camera or background image to tilt, but does not rotate the image. Tilting or pivotal movement can be measured by one of the time-of-flight sensors 92 and/or by an accelerometer or gyroscope positioned, for example, on the gear assembly or the resistor 64 or main handle 44 of the manipulation device 12. A measurement from an accelerometer and/or gyroscope is an absolute measurement, rather than a measurement relative to other components or portions of the device. Measurements from an accelerometer or gyroscope can be prone to drift, reducing accuracy of sensor measurements. In order to avoid such drift, the manipulation device 12 can be configured to automatically calibrate the accelerometer and gyroscope sensors on a regular basis.

Figure 5B:
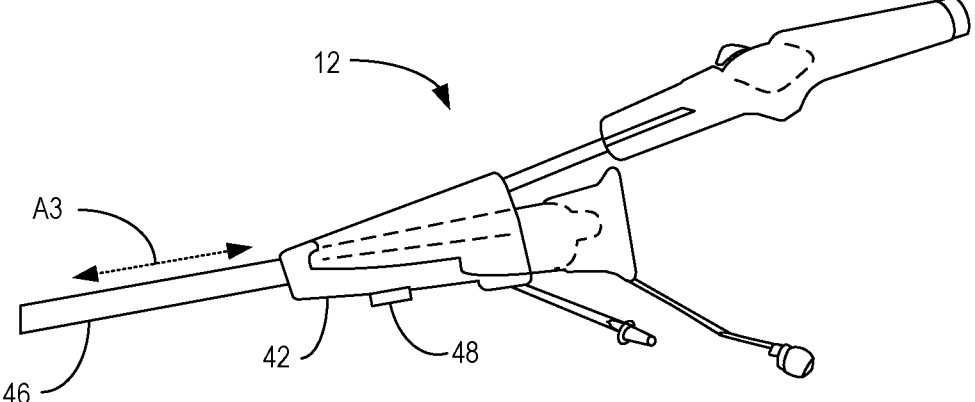

With reference to FIG. 5B, the sensors 18 of the manipulation device 12 can also detect linear movement of the entire manipulation device 12 in a direction of arrow A3 along the longitudinal axis of the hollow tube 46. As previously described, linear movement of the entire manipulation device 12 causes the camera or background image to change in appearance representing either forward movement of the manipulation device 12 into the image and/or toward objects in the image or backward movement of the manipulation device 12 away from the objects in the image. Linear movement of the manipulation device 12 does not rotate the camera or background image shown on the video display 30 (shown in FIG. 1A). Linear movement of the entire manipulation device 12 can be detected by the linear potentiometer positioned proximate to the track 70 or resistor 64 (shown in FIGS. 2A-2D) of the manipulation device 12. In other examples, linear movement of the entire manipulation device 12 is measured by the second time-of-flight sensor 95. In other examples, linear movement of the device 12 can be measured by a pulse counter or linear induction sensor. Since these sensors are not "absolute" sensors, detection of linear movement using the potentiometer 84, induction sensor, or pulse counter does not have issues with drift or lack of accuracy that can occur when using, for example, an accelerometer or gyroscope.

Figure 5C:
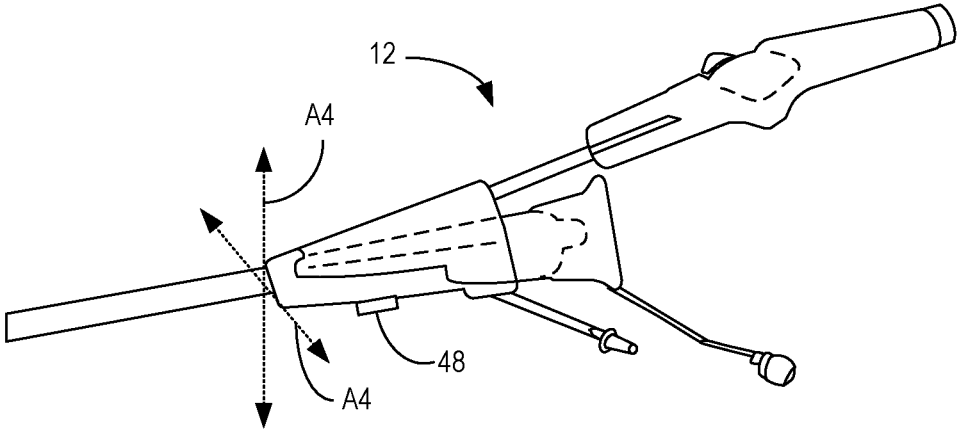

With reference to FIG. 5C, the manipulation device 12 can also translate or move without pivoting in, for example, the horizontal (x) direction and the vertical (z) direction, as shown by arrows A4. In some cases, this translational (non-pivoting) movement of the manipulation device 12 can be detected by sensors configured to measure changes in position of the entire manipulation device 12 relative to the stationary frame 36 (shown in FIGS. 2A-2D). Alternatively, the manipulation device 12 could be fixed or mounted to the stationary frame 36 to prevent translational (non-pivoting) movement of the manipulation device 12. In that case, sensors would not be needed to measure such translational movement of the entire manipulation device 12 in the directions shown by arrows A4 in FIG. 5C.

Figure 6A:
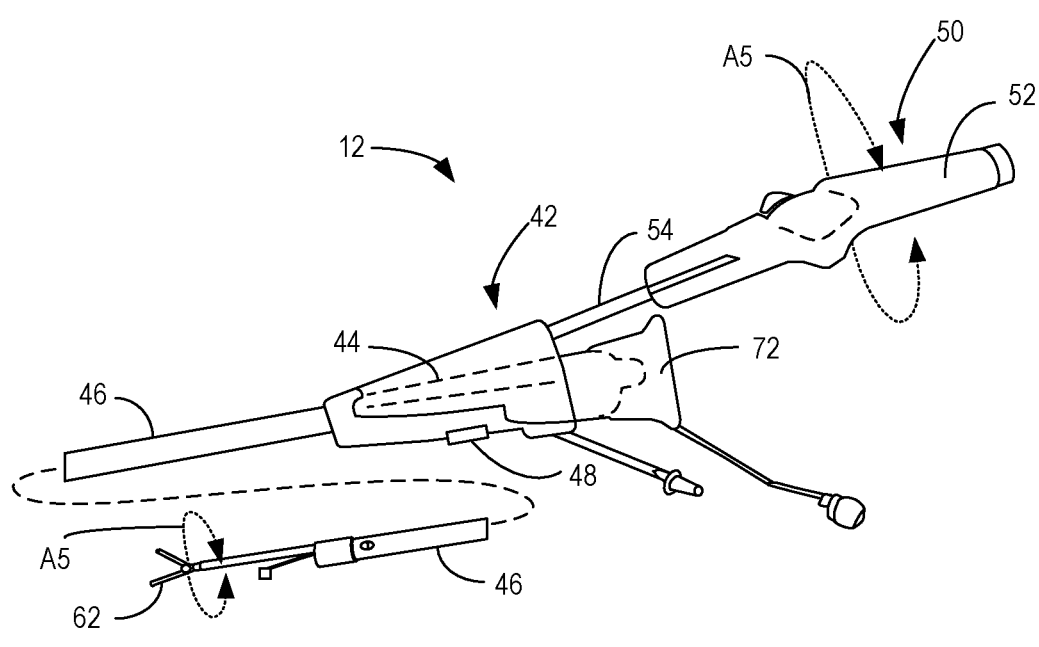
FIGS. 6A and 6B are schematic drawings showing movements for an auxiliary handle of a manipulation device or vessel harvesting tool, according to aspects of the present disclosure.
Figure 6B:
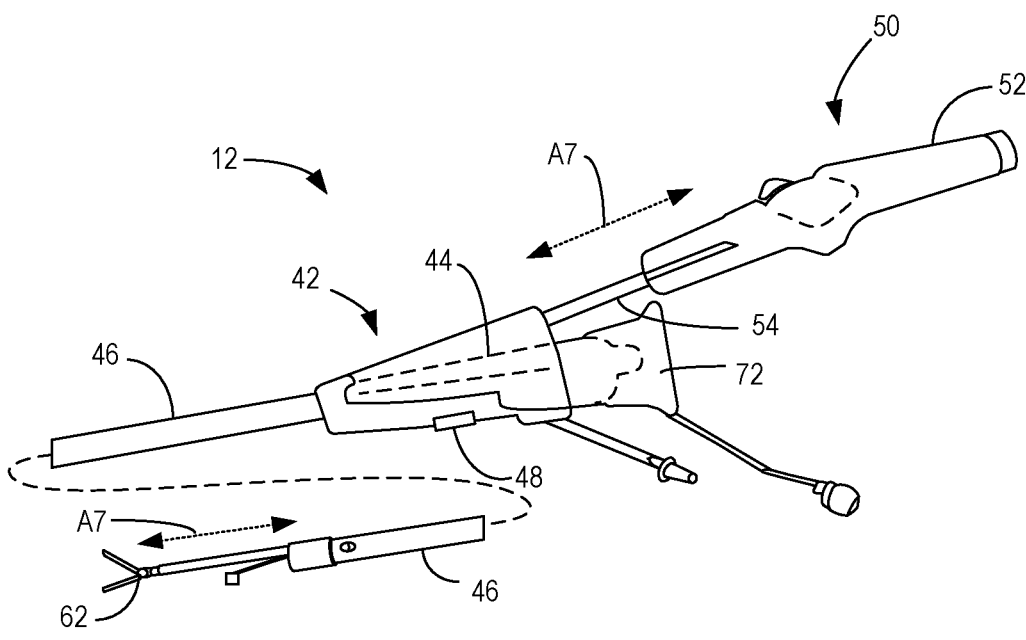

FIGS. 6A and 6B show movement of the inner or second tool 50 relative to the outer or first tool 42. For example, as shown in FIG. 6A, the sensors 18 (shown in FIG. 1A) of the manipulation device 12 can be configured to detect circular movement or rotation of the auxiliary handle 52 of the second tool 50 as shown by arrow A5. Circular movement of the auxiliary handle 52 can cause the shaft 54 and the harvest tool 62 to rotate, while the hollow tube 46 of the outer or first tool 42 remains stationary. Circular movement of the harvest tool 62 can be shown in the video game by changing a position of the objects or visual indications shown on the video display 30 (shown in FIG. 1A) that represent the harvest tool 62 in response to the rotational movement of the auxiliary handle 52 by the user 14. Movement of the auxiliary handle 52 does not change the camera or background image shown on the video display 30. In particular, manipulation of the auxiliary handle 52 does not cause the camera or background image to rotate, spin, or move forward or backward, as occurs when the entire manipulation device 12 is moved. Circular movement of the auxiliary handle 52 can be detected and measured by an encoder or rotational potentiometer 86, such as a 360 degree potentiometer, positioned, for example, in the sensor housing 78 located at the distal end of the manipulation device 12. In other examples, the circular movement of the auxiliary handle 52 can be measured by the encoder/time-of-flight sensor assembly 96.

As shown in FIG. 6B, the sensors 18 of the manipulation device 12 can also be configured to detect linear movement of the auxiliary handle 52 and relative to other parts of the manipulation device 12, as shown by arrows A7 in FIG. 6B. Linear movement of the auxiliary handle 52 causes the shaft 54 to move and the harvest tool 62 to extend or retract from the hollow tube 46 of the outer or first tool 42. As previously described, movement of the auxiliary handle 52 does not change the position of the camera image or cause the camera image to rotate. However, linear movement of the auxiliary handle 52 can change a position of the visual representation of the harvest tool 62 in the video game, which may improve visualization (when the harvest tool 62 is retracted) or obscure a view of the background and/or other objects shown on the video display 30 (when the harvest tool 62 is extended). Linear movement of the auxiliary handle 52 can be detected by the linear potentiometer positioned in the sensor housing 78 or by the encoder/time-of-flight sensor assembly 96. Other sensors mounted to the auxiliary handle 52 or hollow tube 46, such as an induction sensor or a Hall Effect sensor, can also be used for detecting linear movement of the auxiliary handle 52.

Figure 7A:
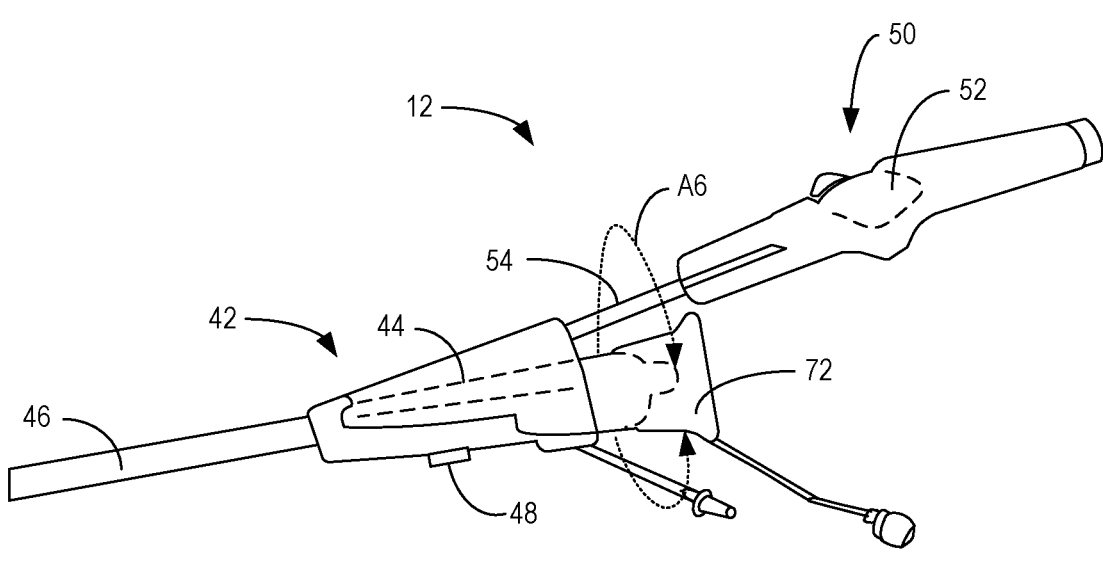
FIGS. 7A and 7B are schematic drawings showing movements of the bell housing and main handle of a manipulation device or vessel harvesting tool, according to aspects of the present disclosure.
Figure 7B:
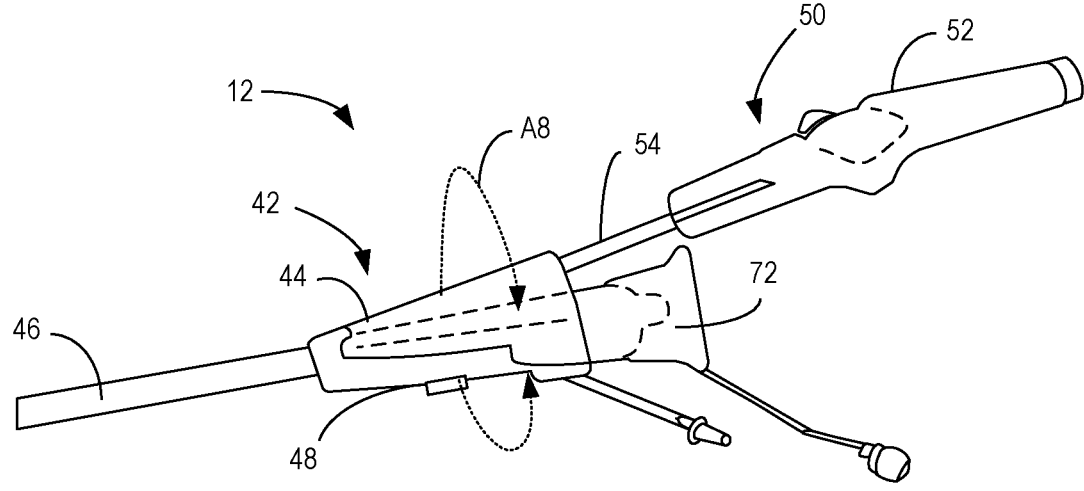

FIGS. 7A and 7B are related to movement of manipulation device 12 relative to the rotatable handle 72 and camera head 74 and/or movement of the rotatable handle 72 and camera head 74 relative to other parts of the manipulation device 12. For example, as shown in FIG. 7A, sensors 18 of the manipulation device 12, specifically the camera position sensor 76 shown in FIG. 1A, can be configured to detect circular movement of the rotatable handle 72 and the camera head 74 in a direction of arrow A6 about a longitudinal axis of the hollow tube 46. Rotation of the camera head 74 causes the camera image shown on the video display 30 (shown in FIG. 1A) to rotate. However, a position and/or orientation of other visual indications shown on the video display 30 for other parts of the manipulation device 12 (e.g., visual representations shown on the video display 30 for the first tool 42 and the second tool 50) do not change. Rotation of the rotatable handle 72 and camera head 74 can be measured by the rotational potentiometer 86, such as the 360 degree potentiometer, positioned in or proximate to the camera head 74. Sensors 18 (shown in FIG. 1A) of the manipulation device 12 can also be configured to detect when other portions of the manipulation device 12 (e.g., the first tool 42 and the second tool 50) are rotated about the rotatable handle 72 in a direction of arrow A8, while the rotatable handle 72 and the camera head 74 remain stationary. Moving the manipulation device 12 in this manner can change an orientation of tools, such as the harvest tool 62 or vessel cradle 60 (shown in FIGS. 4A and 4B), while the camera or background image remains unchanged. Rotation of other portions of the manipulation device 12 about the camera head 74 can be detected by comparing movement detected by the camera position sensor 76, such as the rotational potentiometer 86 positioned on or in the camera head 74, with movement of the first tool 42 detected using the previously described rotational potentiometer 86 positioned near the gears 68 of the resistor 64 (shown in FIGS. 2A-2D).

Figures 8A, 8B:
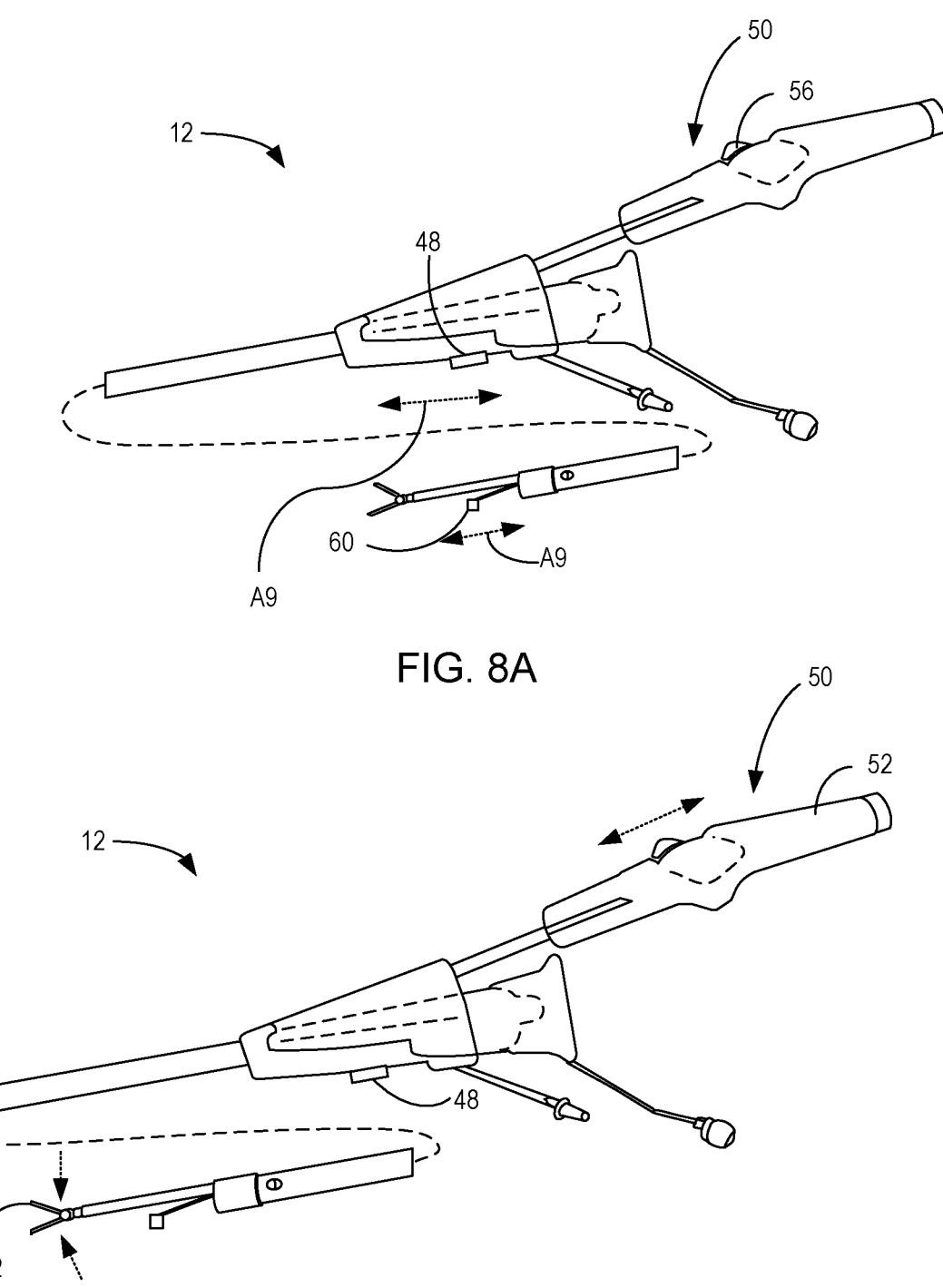
FIGS. 8A and 8B are schematic drawings showing movements for buttons on a main handle and an auxiliary handle of a manipulation device or vessel harvesting tool, as well as movements of distal portions of the vessel harvesting tool, according to aspects of the present disclosure.

FIGS. 8A and 8B show movement of the first button 48, and second button 56 of the manipulation device 12. As shown in FIG. 8A, the user 14 can slide the first button 48 in a direction of arrow A9 to extend or retract the vessel cradle 60. As previously described, sliding of the first button 48, such as the slider or knob, can be detected by the linear potentiometer positioned proximate to the first button 48 or by the button or slider encoder sensor(s) 97. As shown in FIG. 8B, the second button 56 on the auxiliary handle 52 can be advanced in the distal direction away from the user 14 to open jaws of the harvest tool 62, or pulled in the proximal direction toward the user 14 to close the jaws of the harvest tool 62. Sliding the second button 56 farther in the proximal direction toward the user 14 activates the jaws of the harvest tool 62 for cutting and/or sealing tissues or other materials placed between the jaws of the harvest tool 62. Movement of the second button 56 can be detected by the switch or pressure sensor, as previously described. Movement of the first button 48 or the second button 56 does not reposition the camera or change the orientation of the background image shown on the video display 30 (shown in FIG. 1A). However, pressing or moving the first button 48 or the second button 56 can cause visual indications for the vessel cradle 60 and jaws of the harvest tool 62 on the video display 30 to move or adjust position, which can make some portions of the background image displayed on the video display 30 more difficult to see.

Video Display and Game Screens

The video game is displayed to the user 14 or player on the video display 30 of the feedback device 22 (shown in FIG. 1A). Examples of introductory screens and screens for different levels, scenarios, or tasks performed by the user 14 or player in the game are shown in FIGS. 9-10E.

Figure 9:
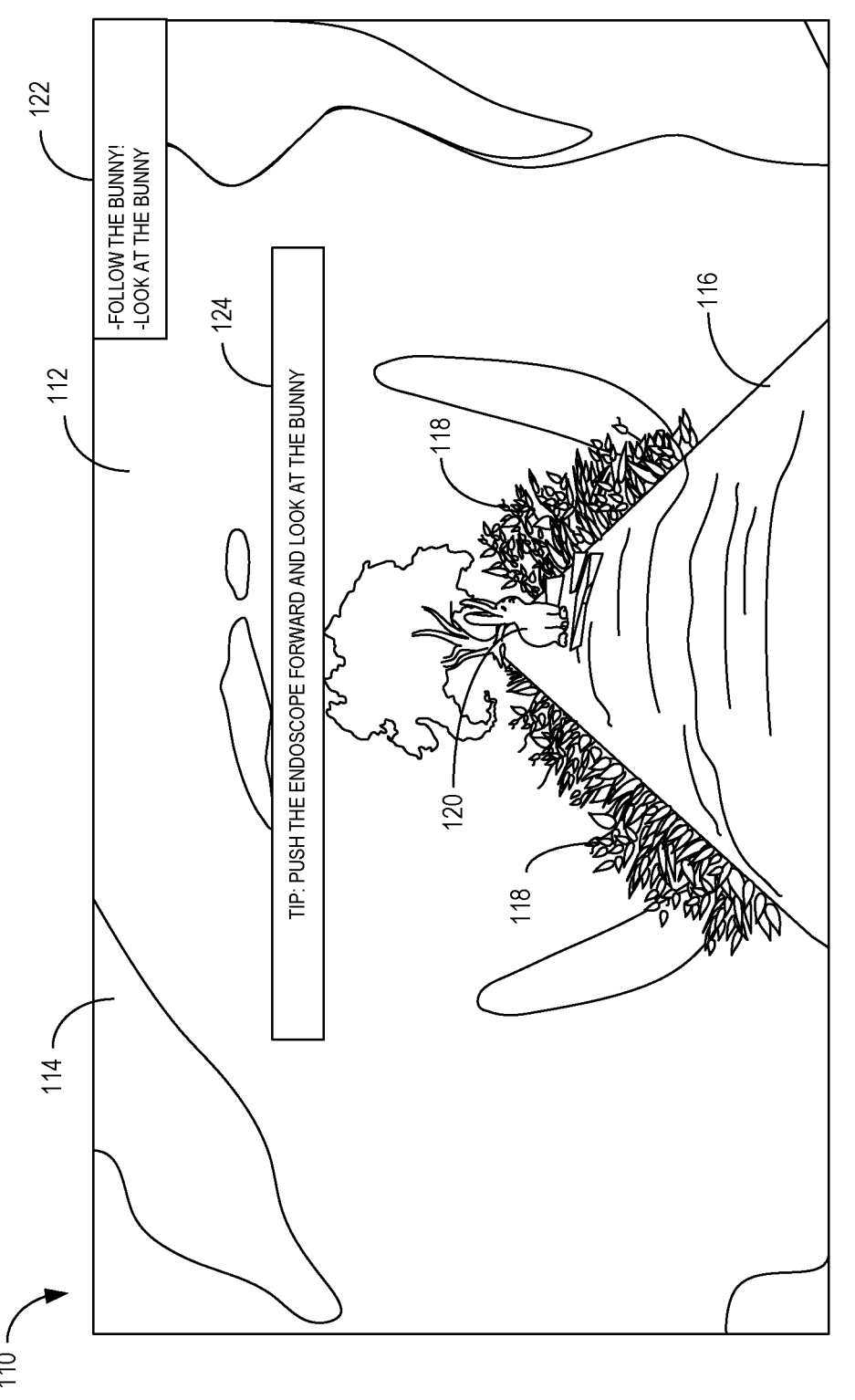
FIG. 9 is a drawing of a game screen of a video game of a training system, according to an aspect of the present disclosure.
Figure 10A:
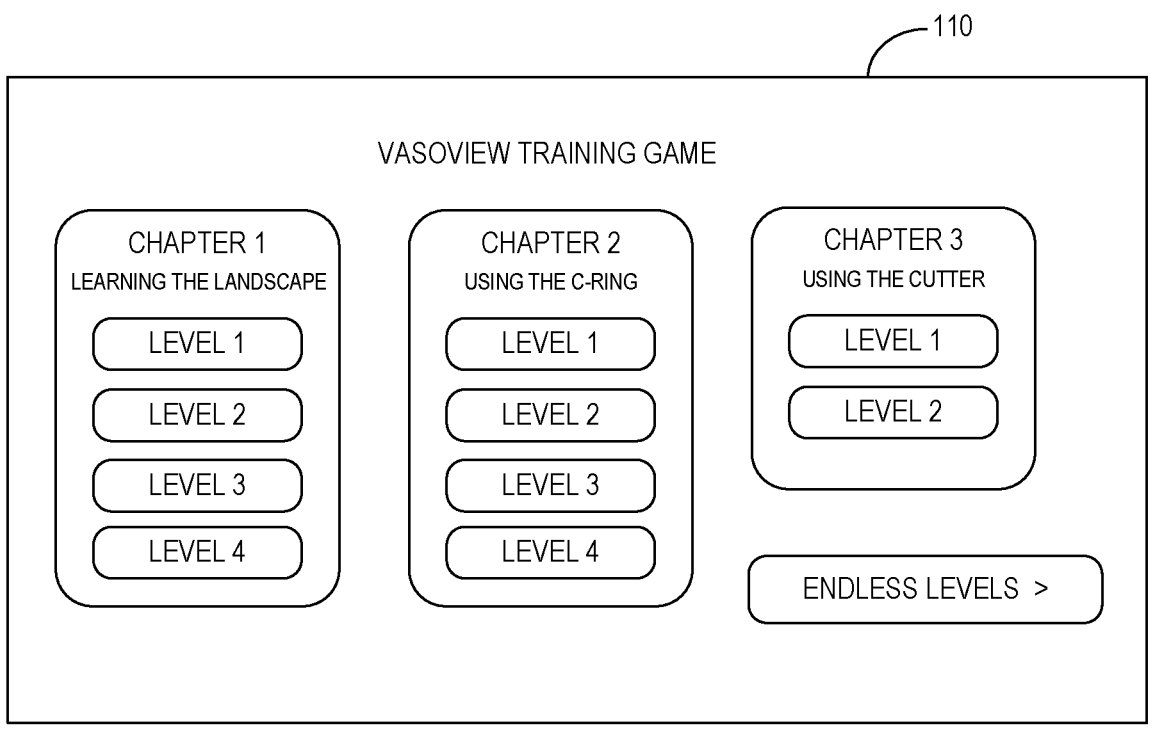
FIGS. 10A and 10B are introductory screens of the video game of FIG. 9.
Figure 10B:
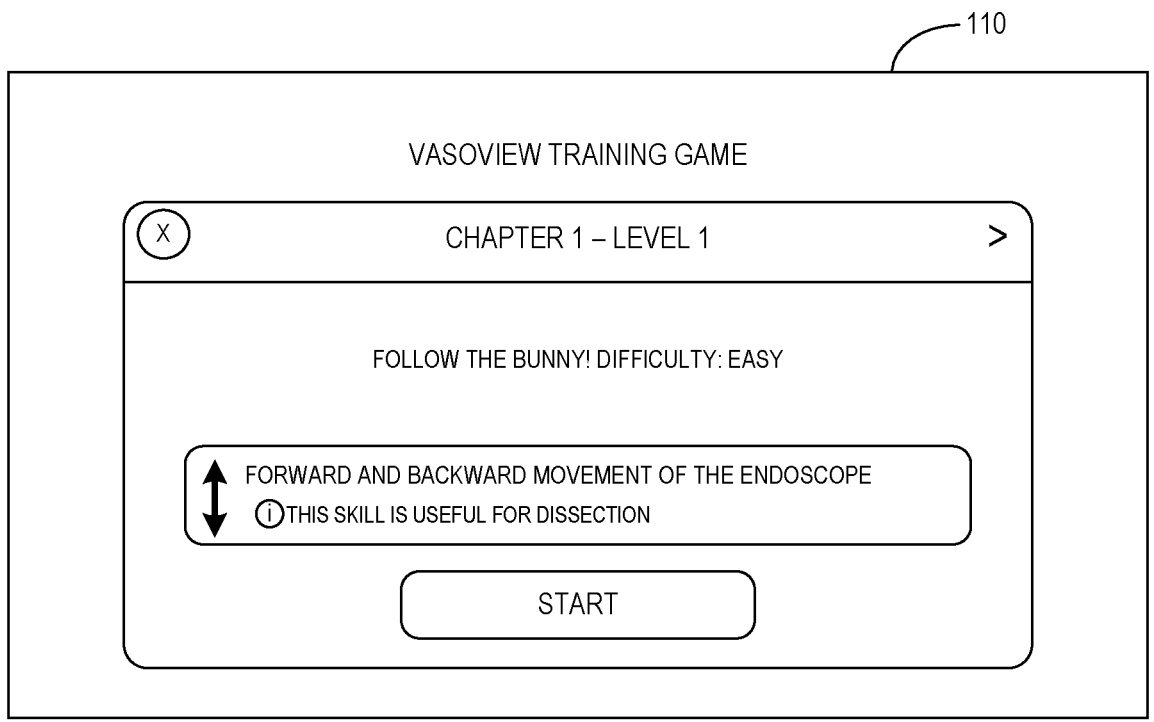
Figure 10C:
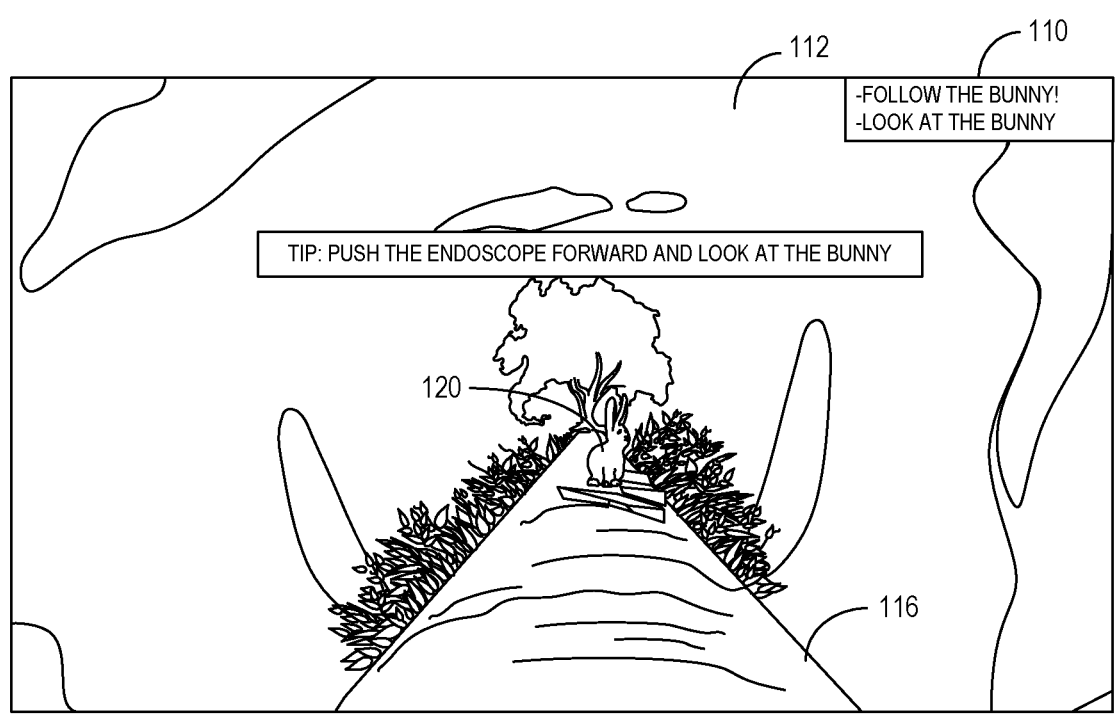
FIGS. 10C-10E are additional game screens of the video game of FIG. 9.

With reference to FIG. 9, the displayed screen 110 can include a variety of visual indications, virtual objects, and other images related to different aspects of the video game. For example, the screen 110 can include a camera or background image 112 that is oriented based on information detected by the camera position sensor 76, as previously described. The camera or background image 112 is generally selected to correspond to the theme of the video game and can include, for example, fantasy elements, nautical themes, or any other appropriate imagery. In some examples, as shown in FIG. 9, the background image 112 can be an image of the sky including clouds 114 depicted on a blue background.

The screen 110 also includes visual indication(s) representative of anatomical structures that can be interacted with and manipulated by the user 14 with the manipulation device 12. For example, the visual indication(s) can include one or more elongate structures representative of components of veins or arteries, such as a curved ground, walking path, and/or a tree limb 116, which extends from a front portion of the screen 110 towards the horizon. The displayed interactive animation can also include visual representations of other objects, obstructions, or items on the screen 110, which can be interacted with by the manipulation device 12. For example, the displayed screen 110 can include targets 118, such as plants (e.g., leaves, mushrooms, orchids, flowers, etc.), branches, or vines extending from the tree limb 116. In some chapters or levels, the user 14 may be instructed to contact, manipulate and/or cut the targets 118 using the vessel cradle 60 and harvest tool 62 of the manipulation device 12 in a similar manner to how an EVH device cuts branched vessels. These targets 118 can be representations of and/or positioned to mimic anatomical structures. For example, tubular objects shown extending from the tree limb 116 on the screen 110 can be representative of the smaller or branching blood vessels. The screen 110 can also include, for example, small cubes, cylinders, discs, or other shapes positioned on or proximate to the tree limb 116. These other small objects can be representative of fat deposits, pieces of tissue, or other debris within a surgical site. In some examples, incorrect movements of the manipulation device 12 by the user 14 can cause objects to move onto or across the screen 110. For example, an incorrect movement by the user 14 can trigger a rockslide or other debris to appear on the screen 110. In other examples, the screen 110 can include visual representations of streams, puddles, water droplets, or similar features, which can be representative of blood at a surgical site. For example, a waterfall may appear when the user 14 incorrectly contacts or pierces a portion of an elongated structure representing a blood vessel.

While not shown in FIG. 9, in some examples, the screen 110 includes visual representations of the tools of the manipulation device 12. For example, the screen 110 can include a visual representation of the vessel cradle 60 and the harvest tool 62. As previously described, the screen 110 could also be configured to display images representative of a dissection tip to allow the user 14 to practice dissection using the vessel harvesting device. In early levels of the video game, no tools may be displayed so that the user 14 is not distracted from learning to move and manipulate the manipulation device 12. In later levels (as shown in FIG. 10E), visual representations of the vessel cradle 60 and harvest tool 62 are provided so that the user 14 can gain experience using the tools during the vessel harvesting procedure. As previously described, the system controller 20 (shown in FIG. 1A) can be configured to cause a position of the tools 60, 62 shown on the screen 110 to change based on the determined movement information detected by, for example, the button sensors 82.

The screen 110 can also include a guide icon 120 that guides the user 14 through a level or chapter of the video game showing the user 14 what direction to move the manipulation device 12 to successfully complete the chapter or level. For example, the guide icon 120 can be a bunny sitting on the tree limb 116. As shown by the instruction 122 on the top right corner of the screen 110, the user 14 is instructed to move the manipulation device 12 to follow the bunny and to keep the bunny within the field-of-view of the camera. The screen 110 can also include a hint or tip 124 that, as shown in FIG. 9, instructs the user 14 to "Push the endoscope forward and look at the bunny." During this first level, the user 14 practices keeping the bunny within view, thereby allowing the user 14 to practice moving the manipulation device 12 in the forward direction in a controlled and efficient manner. In subsequent levels, the user 14 may be required to perform more complex movements to follow the bunny.

As previously described, the interactive animated video displayed on the video display 30 changes in appearance based on movement of the manipulation device 12 by the user 14. For example, the system controller 20 can be configured to change a position of visual indication(s) representative of parts of the manipulation device 12 and/or other virtual objects shown on the screen 110 based on movements performed by the user 14. In particular, movement of the manipulation device 12 detected by the sensors 18 of the manipulation device 12 can change a position of visual indications, icons, graphics, and other objects displayed on the screen 110. For example, the guide icon 120 or bunny can be initially shown at a predetermined position on the screen 110, such as sitting on the tree limb 116. The system controller 20 can be configured to move the guide icon 120 or bunny to other positions on the screen 110 based on the movement information detected by the sensors 18 of the manipulation device 12. For example, if the user 14 stops moving the manipulation device 12 in a forward direction, the guide icon 120 or bunny can run along the tree limb 116 toward the horizon to encourage the user 14 to continue moving the manipulation device 12 forward. In addition to practicing moving the manipulation device 12 in a forward direction, the user 14 can also practice moving the manipulation device 12 side-to-side to improve visualization of objects at a surgical site. For example, the user 14 can practice moving parts of the manipulation device 12 in different directions so that the guide icon 120 or other objects on the screen 110 can be seen more clearly on the screen 110.

Figure 10D:
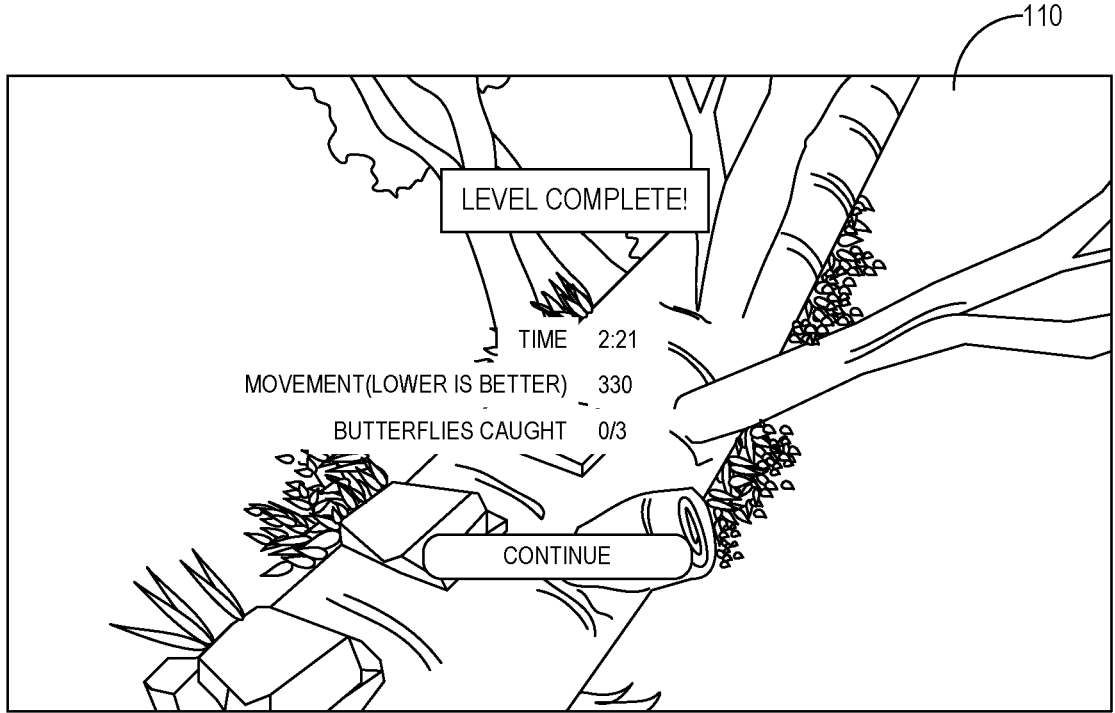
Figure 10E:
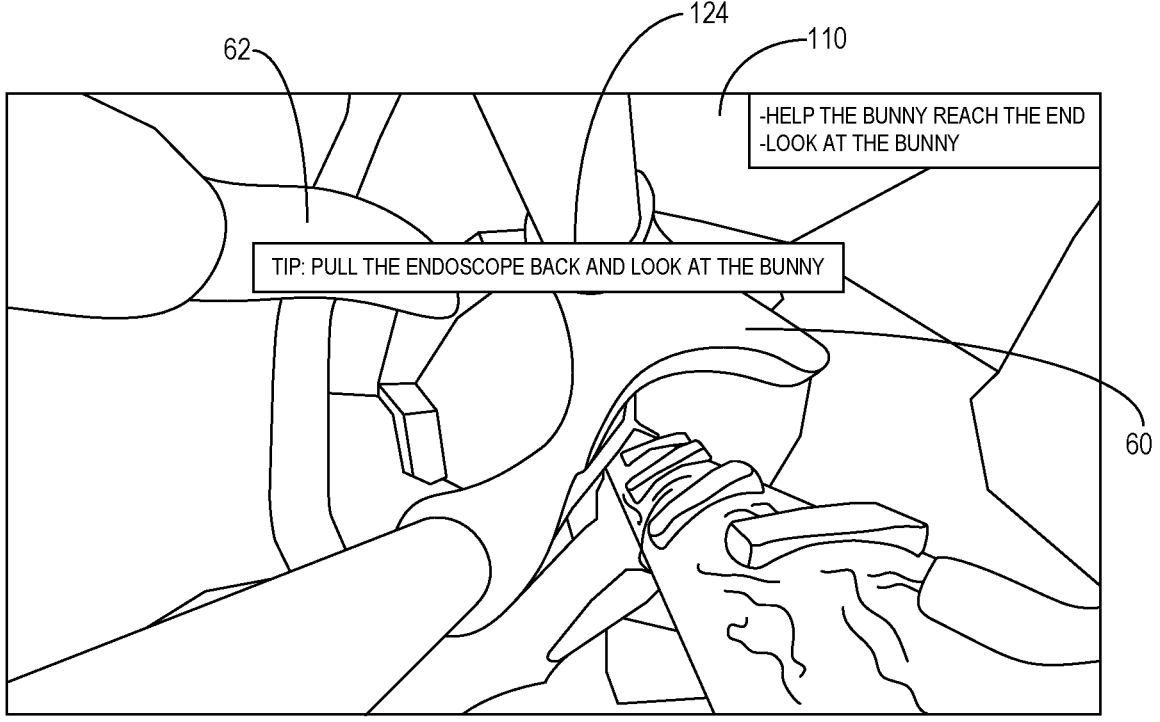

The video game can be divided into levels or tasks to be performed by the user 14 in order to allow the user 14 to practice and/or gain experience in performing different types of movement of a particular medical or surgical procedure, such as the vessel harvesting procedure. In addition to monitoring movement of the manipulation device 12 and adjusting an appearance of objects shown on the screen 110, the system controller 20 can also compare movements and/or movement patterns for the manipulation device 12 by the user 14 to predetermined or target movement patterns. The target or predetermined movement patterns can mimic movement patterns performed by medical personnel performing medical procedures using the manipulation device 12. Based on results of the comparison between the detected movements and predetermined movement patterns, the system controller 20 can be configured to provide feedback and determine whether the user 14 has successfully completed a level and/or is prepared to progress to a next level of the game. Feedback can be provided to the user 14 on the screen 110 at the completion of each level, as shown by FIG. 10D. The feedback can include, for example, a total time needed to perform a predetermined preferred movement pattern or task, or a number of movements of the manipulation device 12 required to complete the predetermined movement pattern or task. Feedback can also include an accuracy score showing the user 14 a percentage of movements performed that matched the predetermined movement pattern.

Levels and Game Play

As previously described, the training system 10 of the present disclosure is used to play the video game that instructs the user 14 in proper use of a medical device, such as the vessel harvesting tool 62. The video game can include one or more chapters, sub-chapters, or levels in which the user 14 or player practices performing skills and movement patterns required for proper execution of a surgical procedure, such as the vessel harvesting procedure. The video game, which is also described as a computer-implemented method, includes an initial step of causing the video display 30 of the training system 10 to provide a first chapter or level of an interactive video animation requiring a first movement pattern for successful completion of the first level. The method can also include a step of receiving and processing signals from the sensors 18 of the manipulation device 12 to determine movement information for the manipulation device 12. The method also includes a step of comparing the movement information for the manipulation device 12 to a first movement pattern for the first chapter or level to determine when the first chapter or level is successfully completed.

Upon successful completion of the first chapter or level, the video game or computer-implemented method can include causing the video display 30 to display a second chapter or level of the interactive video animation requiring a second movement pattern for successful completion. For example, the second movement pattern for successful completion of the second chapter or level can be a movement pattern that more closely corresponds to movements performed during a surgical procedure compared to movements required for the first level or chapter.

As used herein, a movement pattern more closely corresponds to movements performed during a surgical procedure when, for example, the movement pattern includes similar motions performed in a similar sequence to movements performed during the surgical procedure. For example, similar motions can include moving in substantially a same direction (e.g., within about 5% or about 10%) over substantially a same distance (e.g., within about 5% or about 10%) as performed by a medical professional performing a surgical procedure. Movement patterns that closely correspond to movements performed during the surgical procedure can also include movements of a similar complexity to movements performed during the surgical procedure, movements which require a similar number of discrete movement actions as the surgical procedure, or which require movements of similar difficulty compared to movements performed during the surgical procedure.

In some examples, the movement pattern of the second chapter or level is more complex than the movement pattern required for successful completion of the first level. For example, the first movement pattern can require movement of the manipulation device 12 along one axis or within one plane, such as by moving the manipulation device 12 forward and backward along a longitudinal axis of the manipulation device 12. The second movement pattern can require moving the manipulation device 12 in each of a forward direction, a backward direction, and in side-to-side directions. Similarly, the first movement pattern can require movement of the manipulation device 12 in a first plane. The second movement pattern can require movement of the manipulation device 12 in each of the first plane and a second plane transverse to the first plane. In other examples, the second pattern can include pivoting the manipulation device 12 about a pivot point to change the field of view of the endoscope or camera or to change the direction of movement of the manipulation device 12.

In other examples, the second movement pattern may include a more complex sequence of movements compared to movements required for successful completion of the first chapter or level. For example, in order to successfully complete the first level, the user 14 may be required to perform one movement (e.g., move the manipulation device 12 in the proximal or forward (distal) direction). A more complex movement sequence can include, for example, a combined movement pattern including moving the manipulation device 12 forward a predetermined distance and, after the manipulation device 12 is moved forward by the predetermined distance, pivoting the manipulation device 12 to change the field-of-view of the camera.

In some examples, the second and subsequent levels of the game can include projected icons or objects, shown on the screen 110 of the video game, that obscure the user's 14 view of other objects or medical devices displayed on the screen 110. The user 14 may be required to move the manipulation device 12 to improve visualization or to perform certain tasks of the medical procedure with only limited visibility. For example, some levels of the video game can include distractions, such as virtual representations of rock slides, smoke, fog, rain, or other liquids, making it more difficult for the user 14 to see certain objects on the screen 110. The virtual smoke can represent, for example, smoke from cauterized tissue produced during the surgical procedure. Virtual liquid or fluid passing through the scene on the screen 110 can represent the patient's blood during a surgical procedure, which can occur if, for example, a vein or other vascular tissue is cut during a surgical procedure.

In some examples, the video game can include a final level including a simulation of a surgical procedure. The final level or surgical simulation can include an interactive video animation including images representative of a real-life vessel harvesting surgical procedure. The movements of the final movement pattern required to successfully complete the final level can be substantially the same as or representative of movements performed by medical personnel using a vessel harvesting device during the real-life vessel harvesting surgical procedure.

FIG. 11 is a flowchart showing how a user 14 or player progresses through a video game of the present disclosure. The exemplary video game is a fantasy game including: the guide icon 120 or bunny, which guides the user 14 through the levels; the tree limb 116, which represents a vessel of a surgical site; and other objects representing other anatomical structures or medical instruments or tools at a surgical scene. FIGS. 10A and 10B show examples of introductory screens 110 that can be shown to users 14 in the video game. FIGS. 10C-10E are several game screens for different levels of the tree limb 116 and bunny video game.

The video game example of FIGS. 10A-10E can include chapters containing levels to be completed to gain experience using the manipulation device 12, such as the vessel harvesting device. Early chapters can focus on teaching basic handling of the manipulation device 12 with increasing difficulty. The levels can start with an explanation of how to perform a particular movement pattern using the manipulation device 12. During a level, the user 14 practices performing the explained movement pattern and may attempt to complete one or more goals. In some chapters or levels, the goals are provided to the user 14 at the beginning of the level. In other examples, goals are gradually given to the user 14 throughout the level based on the user's 14 progress through the level. At the end of a chapter or level, once all goals have been attempted or completed, feedback can be given, including, for example, how much time was needed to complete the level (e.g., movement speed) and how many individual movements the user 14 made to complete the level (e.g., movement efficiency). This feedback can help users 14 to assess their progress and, for example, to compare current performance of a level to a previous effort to complete the level to see whether performance has improved. Later chapters can contain levels that combine all of the previous levels and have a more sandbox-like experience, allowing the user 14 to practice using the manipulation device 12 in an unguided manner. As previously described, a final chapter or level can be a surgical simulation level.

With reference to FIG. 11, the game play method for the video game example can include, at step 310, displaying an introductory or level select screen 110 (shown in FIG. 10A) to the user 14 on the video display 30. The user 14 can select a chapter and/or level to complete. For example, as shown in FIG. 10A, the user 14 or player can select between Chapter 1, Chapter 2, and Chapter 3. Chapter 1 includes levels (e.g., Levels 1-4) that provide instruction for and test the user 14 or player's ability to use the manipulation device 12 to perform simple tasks. For example, in Chapter 1, Level 1, the user 14 can practice moving the main handle 44 of the first tool 42 of the manipulation device 12 in a forward direction causing images on the screen 110 to represent moving forward or towards objects displayed on the screen 110 or moving the main handle 44 backwards to represent moving backwards or away from objects displayed on the screen 110. The user 14 or player can also practice pivoting the manipulation device 12 to change the field-of-view or twisting the rotatable handle 72 and the camera head 74 to change an orientation of the field-of-view of the camera. In Chapter 1, Level 2, the user 14 may practice pivoting the manipulation device 12 up and down or side to side. In Chapter 1, Levels 3 and 4, the user 14 or player may practice performing other more difficult movement tasks.

The levels of Chapter 2 provide instruction for and allow the user 14 to practice using the vessel cradle 60. For example, the user 14 can practice extending or retracting the vessel cradle 60 using the first button 48 of the manipulation device 12. More specifically, in some examples, at Chapter 2, Level 1, the user 14 can practice extending the vessel cradle 60 by proper distance to, for example, contact objects on the screen 110. At Chapter 2, Level 2, the user 14 can practice rotating or twisting the vessel cradle 60 one time by, for example, rotating the main handle 44 of the manipulation device 12, so that the vessel cradle 60 rotates around a virtual representation of a vein shown on the screen 110. At Chapter 2, Level 3, the user 14 can practice using the vessel cradle 60 to practice cradling the virtual representation of the vein with the vessel cradle 60. At Chapter 2, Level 4, the user 14 can practice advancing and retracting the vessel cradle 60 and rotating the vessel cradle 60 around both sides of the virtual representation of a vessel.

In the levels of Chapter 3 of the video game example, the user 14 can practice using the jaws of the harvest tool 62. For example, in the levels of Chapter 3, the user 14 can receive instructions for and practice using the inner second tool 50 and second button 56 to manipulate the harvest tool 62. Also, the user 14 can slide the second button 56 on the auxiliary handle 52 in the distal direction away from the user 14 to open the jaws of the harvest tool 62, advance the inner second tool 50 to capture an object within the jaws, slide the second button 56 in the proximal direction toward the user to close the jaws of the harvest tool 62, and/or slide the second button 56 farther in the proximal direction toward the user 14 to activate the jaws of the harvest tool 62 for cutting and/or sealing tissue or other materials within the jaws. The user 14 can also practice moving the auxiliary handle 52 or other parts of the manipulation device 12 in order to move the jaws of the harvest tool 62 towards objects on the screen 110 that need to be cut. For example, the user 14 can practice cutting different targets 118, such as plants, leaves, mushrooms, or branches extending from the tree limb 116, as shown in FIG. 10C. More specifically, in Chapter 3, Level 1, the user 14 can practice moving the second tool 50 forward and backward in relation to the first tool 42 and sliding the second button 56 to open and close the jaws of the harvest tool 62. At Chapter 3, Level 2, the user 14 practices using the jaws of the harvest tool 62 to cut virtual branches. For example, the user 14 can both extend and rotate the harvest tool jaws 62 to align and cut the objects or vein branches with the jaws of the harvest tool 62 to harvest the vein. In Chapter 4 the user 14 practices using both the vessel cradle 60 and the harvesting tool 62 to perform the task of exposing and cutting virtual branches. Chapter 4, Level 1 is the easiest level with targets that are easily accessible. Subsequent levels can use targets that are harder to access increasing difficulty for such subsequent levels. Chapter 5 can include free-form exercises or levels that allow the user 14 to practice all skills previously learned in an unguided manner.

At step 312, once the user 14 selects a chapter and level to play, a level start screen 110 (shown in FIG. 10B) is displayed on the video display 30. The level start screen 110 can include an instruction for the task to be performed (e.g., "Follow the Bunny") and a difficulty level for the test. For example, for Chapter One/Level One, the difficulty level is Easy. The level start screen 110 can also include a description of the skills that will be practiced and learned while completing the selected chapter and level. For example, as shown in FIG. 10B, the user 14 practices forward and backward movement of the manipulation device 12 and endoscope.

At step 314, after the user 14 or player sees the level start screen, a game screen 110 for playing the selected chapter and level of the video game is displayed on the video display 30. As previously described, the game screen 110 includes the background image 112 or camera image, visual indication(s) of elongated structures, such as a vein, and visual representations of other objects. For example, as shown in FIG. 10C, the game screen 110 includes the elongated path 116, which can represent a vein for a vessel harvesting procedure, and the image of the guide icon 120 or bunny. As previously described, the user 14 follows the guide icon 120 or bunny by performing a movement pattern, such as by moving the manipulation device 12 in a forward direction.

At step 316, as the user 14 attempts to successfully complete the first level, the system controller 20 receives and processes signals from sensors 18 of the manipulation device 12 to determine movement information for movements performed by the user 14. For example, in order to complete the first level, the user 14 may only be required to move the manipulation device 12 forward and backward to follow the guide icon 120 or bunny. In other examples, the user 14 may practice twisting or tilting the entire manipulation device 12 and/or moving some parts of the manipulation device 12 relative to other parts of the manipulation device 12 to be able to see the guide icon 120 or bunny more clearly.

At step 318, the system controller 20 is next configured to compare the movement information for the manipulation device 12 to a movement pattern for completing the level successfully. For example, the system controller 20 can be configured to determine whether the user 14 moves the manipulation device 12 forward in a correct manner to follow the guide icon 120 or bunny. The system controller 20 can also determine whether the manipulation device 12 was moved incorrectly during the first level. For example, an incorrect movement could include twisting or rotating parts of the manipulation device 12 at incorrect times or pressing or sliding buttons 48, 56 to extend or retract the vessel cradle 60 or harvest tool 62 at incorrect times.

At step 320, upon successful completion of the first level, the system controller 20 is configured to cause the feedback device 22 to provide feedback to the user 14. For example, a feedback screen or Level Complete! screen 110 (shown in FIG. 10D) could be displayed on the video display 30. As previously described, the feedback can include, for example, a total time to complete the level (e.g., movement speed) and a number of movements needed to complete the level (e.g., movement efficiency). The feedback screen 110 can also include information about other tasks or goals that could have been completed during the level. For example, the user 14 may be instructed to attempt to contact virtual objects displayed on the screen 110 using the vessel cradle 60 and/or jaws of the harvest tool 62 of the manipulation device 12. More specifically, the user 14 could be instructed to catch flying animals or objects, such as a bird or butterfly, which appear on the screen 110 in proximity to the tree limb 116. In that case, the feedback in FIG. 10D can include displaying information about a number of butterflies caught or other targets contacted during the level. In some examples, as shown in FIG. 10D, the feedback can be displayed as a ratio of butterflies caught (e.g., successful efforts) versus a total number of butterflies that appeared on the screen 110 (e.g., total number of attempts).

At step 322, the video game example progresses to a second level or chapter. For example, the system controller 20 can be configured to cause a game screen 110 for a second level or chapter to be displayed on the video display 30. The second level or chapter may require the user 14 to perform a second movement pattern in order to successfully complete the second level or chapter. The second movement pattern can include, for example, pivoting or tilting the manipulation device 12, moving a part of the manipulation device 12 relative to other parts of the manipulation device 12, or manipulating the first button 48 and/or second button 56 of the manipulation device 12.

For example, in the video game including the guide icon 120 or bunny and tree limb 116, progressing to the second level or chapter can include displaying a video animation on the video display 30 where the guide icon 120 or bunny jumps into a hole of the tree limb 116 or tree trunk. The second chapter or level can then take place inside a hole, the tree branch or tree trunk, which can represent a harvesting tunnel. An example of a game screen 110 for a second or later level of the video game is shown in FIG. 10E, with the guide icon 120 or bunny inside a rabbit hole, tree trunk, or tree limb 116. The game screen 110 of FIG. 10E also shows visual indications for the vessel cradle 60 and the jaws of the harvest tool 62. The game screen 110 also displays the hint or tip 124 which, in FIG. 10E, instructs the user 14 that pulling the endoscope or main handle 44 backwards may provide a better view of the scene making it easier to see the guide icon 120 or bunny. The user 14 may also move the vessel cradle 60 or jaws of the harvest tool 62 to get a better view of the guide icon 120 or bunny.

The user 14 can continue to progress through the different chapters and levels of the video game, giving the user 14 an opportunity to practice different actions and movement patterns for the manipulation device 12. For example, in some levels, the user 14 may practice moving the second tool 50 of the manipulation device 12 relative to the first tool 42 of the manipulation device 12. In other levels or examples, the user 14 may practice cutting different objects (such as plants, leaves, or vines) displayed on the video display 30. In some levels, the user 14 may practice performing actions when visualization is poor. For example, smoke or liquid may be displayed on the video display 30 making it harder for the user 14 to see objects and icons displayed on the screen 110.

At step 324 of the video game example, in a final chapter or level, the system controller 20 can cause the video display 30 to provide a final level with a simulation of a surgical procedure, such as a simulation of a vessel harvesting procedure performed using a vessel harvesting device. For example, the system controller 20 can cause the video display 30 to show a screen 110 with images of a real-life vessel harvesting surgical procedure. In order to successfully complete the final level, the user 14 can be required to perform movement patterns needed to perform the actual surgical procedure. In performing movements to complete the surgical simulation, the training system 10 helps the user 14 to see how skills and movement patterns practiced to successfully complete previous chapters and levels in the fantasy world relate to a real-life surgical procedure, such as to a real-life vessel harvesting procedure.

The video game including the bunny and tree limb described herein is only one example of a type of video game that can be created for use with the manipulation device 12 and training system 10 of the present disclosure. Many different types of video games based on different themes and including different characters, environments, and narratives may also be created by those skilled in the art for use with the training system 10 and manipulation device 12 of the present disclosure.

In some examples, the video game can have a fantasy-adventure theme in which a user 14 or player fights a villain or monster using, for example, the jaws of the harvest tool 62 of the manipulation device 12. For example, the game screen 110 for the fantasy-adventure game can include a mast and rigging of a pirate ship or tall ship. The elongated mast and cross-beams can represent blood vessels. The user 14 can practice moving the manipulation device 12 forward and backward, which represents movement of the video game character along the cross beams or mast. In order to successfully complete levels of the fantasy-adventure video game, the user 14 can practice using the jaws of the harvest tool 62 of the manipulation device 12 to protect the ship from, for example, a sea monster, such as a hydra or multi-headed serpent, by attempting to cut the sea monster's heads and/or tentacles. As in previous examples, the game screen 110 can include visual representations that represent movement of the jaws of the harvest tool 62 and other parts of the tools 42, 50 of the manipulation device 12. For example, the game screen can show a weapon, such as a sword, pike, cutlass, axe, or similar cutting implement, to represent position and movement of the jaws of the harvest tool 62 of the manipulation device 12. The user 14 can successfully complete a level by, for example, cutting all of the heads or tentacles off the hydra or serpent to protect the ship.

In another example, the video game can have an athletic or sports theme. For example, in the video game, the user 14 can practice moving the manipulation device 12 to guide an athlete in a race, such as an athlete running hurdles. In order to move the athlete through the hurdles, the user 14 can practice moving the manipulation device 12 in a forward direction to move along the racecourse or track. The user 14 can also practice pivoting the manipulation device 12 in an upward direction to simulate jumping over a hurdle. If the user 14 fails to pivot the manipulation device 12 at an appropriate time and/or to an appropriate angle, the athlete may run into and/or knock over a hurdle. Following the race, the video game could provide feedback about a number of hurdles successfully jumped over and/or a number of hurdles that the athlete knocked over because the user 14 failed to pivot the manipulation device 12 correctly.

In other examples, the video game can include different types of targets or guides for guiding movement of the user 14. For example, the video game could be directed to a worm moving through a piece of fruit, such as an apple. The user 14 could be instructed to move the manipulation device 12 to follow the worm through passages or cavities in the apple. In order to successfully follow the worm through the apple, the user 14 may be required to practice moving the manipulation device 12 in a forward direction to advance towards the worm and/or to prevent the worm from getting too far ahead of the camera or endoscope's field-of-view. The user 14 may also be required to pivot, twist, or rotate portions of the manipulation device 12 to follow the worm through narrow and/or curved passageways in the apple. The user 14 may also practice using the jaws of the harvest tool 62 to cut obstructions or blockages from certain passages so that he or she can continue to advance through passageways in the apple following the worm.

Although various non-limiting examples of the invention have been described in detail for the purpose of illustration based on what is currently considered to be the most practical and preferred aspects, it is to be understood that such detail is solely for that purpose and that the invention is not limited to the disclosed examples, but, on the contrary, is intended to cover modifications and equivalent arrangements that are within the spirit and scope of the appended claims. For example, it is to be understood that the present disclosure contemplates that, to the extent possible, one or more features of any example can be combined with one or more features of any other aspect or example.

The invention claimed is:

1. A training system that allows a user to practice performing movements commonly performed during an endoscopic vessel harvesting surgical procedure, the system comprising:
    a manipulation device representative of components of a vessel harvesting device, the manipulation device comprising:
        a first tool comprising a main handle configured to be grasped by the user, a hollow tube extending from the main handle, and at least one first button on the main handle;
        a second tool comprising an auxiliary handle configured to be grasped by the user, a shaft inserted through an opening in the main handle and movable through the hollow tube of the first tool, and at least one second button on the auxiliary handle; and sensors configured to detect movement of the manipulation device, movement of the second tool relative to the first tool, or actuation or pressing of the at least one first button or the at least one second button;
    a video display; and
    a controller in electronic communication with the sensors of the manipulation device and the video display, the controller configured to:
        receive and process signals from the sensors of the manipulation device to determine movement information for the manipulation device; and
        cause at least one visual indication to be provided on the video display at a position on the video display based, at least in part, on the determined movement information.

2. The system of claim 1, wherein the manipulation device is a size and shape of the vessel harvesting device used in the endoscopic vessel harvesting surgical procedure.

3. The system of claim 1, wherein the at least one visual indication provided on the video display is not an anatomical structure shown in connection with a virtual simulated surgical procedure.

4. The system of claim 1, wherein the sensors comprise at least one button sensor that detects movement of the at least one first button or the at least one second button, and
    wherein the controller is further configured to receive and process signals from the at least one button sensor to detect the actuation or pressing of the at least one first button or the at least one second button, and to modify the position of the at least one visual indication on the video display based on the detected pressing or actuation.

5. The system of claim 4, wherein the at least one first button comprises a slider, and the at least one button sensor comprises at least one of a switch, an encoder, a linear potentiometer, or a voltage divider.

6. The system of claim 5, wherein the at least one slider represents a slider that extends or retracts a vessel cradle, such as a c-ring, that extends from a distal end of the vessel harvesting device, and/or wherein the at least one second button of the second tool represents a button that controls jaws of a harvesting tool or the vessel harvesting device configured to cut or seal vein branches.

7. The system of claim 1, wherein the at least one second button comprises an activation toggle, and the at least one button sensor comprises at least one of a switch, an encoder, a linear potentiometer, or a voltage divider.

8. The system of claim 1, wherein the sensors of the manipulation device are configured to detect at least the following movements of the manipulation device: rotation of the entire manipulation device about a longitudinal axis of the manipulation device; pivoting of the entire manipulation device about a pivot point; or linear movement of the manipulation device in at least one direction.

9. The system of claim 8, wherein the sensors comprise at least one of an encoder, time-of-flight sensor, accelerometer, or gyroscope configured to sense signals representative of linear or rotational movement of the entire manipulation device.

10. The system of claim 1, wherein the sensors comprise a potentiometer or a voltage divider mounted to a stationary frame configured to sense movement of the entire manipulation device relative to the stationary frame.

11. The system of claim 1, wherein the sensors of the manipulation device are configured to detect at least the following movements of the second tool relative to the first tool: rotation of the auxiliary handle of the second tool about a longitudinal axis of the second tool; or linear movement of the shaft of the second tool through the main handle and through the hollow tube of the first tool.

12. The system of claim 11, wherein the sensors comprise a linear encoder, time-of-flight sensor, or linear potentiometer for measurement of linear movement of the second tool relative to the first tool, and a rotational encoder or rotational potentiometer for sensing rotational movement of the second tool relative to the first tool, and wherein the movement information determined by the controller is based, at least in part, on differences in signals detected by the linear encoder, time-of-flight sensor, or linear potentiometer and the rotational encoder or rotational potentiometer.

13. The system of claim 1, wherein the manipulation device further comprises at least one resistor coupled between the first tool and the second tool configured to provide resistance to movement of the second tool relative to the first tool.

14. The system of claim 13, wherein the manipulation device is configured to adjust a resistance of the at least one resistor to mimic forces exerted on a medical device during a surgical procedure.

15. The system of claim 13, wherein the at least one resistor comprises a gear mounted within a track and configured to travel along the track as the second tool is inserted into or retracted from the first tool.

16. The system of claim 1, further comprising a rotatable handle extending from the main handle of the first tool, the rotatable handle comprising a camera head and at least one camera position sensor configured to determine movement of the rotatable handle and the camera head relative to the main handle.

17. The system of claim 16, wherein the at least one camera position sensor of the rotatable handle is in communication with the controller and wherein the controller is configured to:

receive and process signals from the at least one camera position sensor of the rotatable handle to determine an orientation of the camera head relative to the main handle; and modify an orientation of a background image provided on the video display based on the determined orientation.

18. The system of claim 17, wherein the background image and the at least one visual indication are provided on the video display simultaneously.

19. The system of claim 17, wherein when the controller is further configured to:

determine a direction and magnitude of rotation of the camera head relative to the main handle based on the received and processed signals from the at least one camera position sensor or other sensors; and cause the background image on the video display to rotate to correspond to the determined magnitude and direction.

20. The system of claim 1, wherein the controller is further configured to provide a guide icon on the video display which is initially provided at a predetermined position on the video display, and wherein the controller is configured to move the guide icon to other positions on the video display based on the movement information detected by the sensors of the manipulation device.

21. The system of claim 20, wherein movement of the manipulation device in at least one direction causes portions of the at least one visual indication to disappear from the video display so that the guide icon can be more easily seen or wherein movement of the manipulation device in other directions causes the at least one visual indication to obscure the guide icon shown on the video display.

22. The system of claim 1, wherein the controller is configured to compare the determined movement information to predetermined preferred movement patterns and to provide feedback on the video display based on the comparison.

23. The system of claim 22, wherein the feedback comprises at least one of a total time to perform at least one of the predetermined preferred movement patterns or a number of movements of the manipulation device required to complete the at least one of the predetermined preferred movement patterns.

24. The system of claim 1, wherein the video display comprises a virtual reality or augmented reality display.

* * * * *